(12) United States Patent
Byrne et al.

(10) Patent No.: US 8,372,515 B2
(45) Date of Patent: Feb. 12, 2013

(54) SILANE COATING COMPOSITIONS CONTAINING SILICON-BASED POLYETHER COPOLYMERS, METHODS FOR COATING METAL SURFACES AND ARTICLES MADE THEREFROM

(75) Inventors: Christopher M. Byrne, Mohegan Lake, NY (US); George Policello, Ossinging, NY (US); Suresh Rajaraman, Macungie, PA (US)

(73) Assignee: Momentive Performance Materials Inc., Albany, NY (US)

( * ) Notice: Subject to any disclaimer, the term of this patent is extended or adjusted under 35 U.S.C. 154(b) by 483 days.

(21) Appl. No.: 12/684,326

(22) Filed: Jan. 8, 2010

(65) Prior Publication Data
US 2010/0178521 A1    Jul. 15, 2010

Related U.S. Application Data

(60) Provisional application No. 61/143,647, filed on Jan. 9, 2009.

(51) Int. Cl.
*C08L 71/02*    (2006.01)
*C08L 83/04*    (2006.01)
*C08L 83/12*    (2006.01)
*B32B 9/04*    (2006.01)

(52) U.S. Cl. .............. 428/448; 106/287.11; 106/287.13; 106/287.16; 428/447; 524/376; 524/379; 524/386; 524/430; 528/25; 528/31; 528/35

(58) Field of Classification Search .................. None
See application file for complete search history.

(56) References Cited

U.S. PATENT DOCUMENTS

| | | | |
|---|---|---|---|
| 5,399,290 A * | 3/1995 | Haberle et al. ........... | 252/299.01 |
| 5,558,806 A | 9/1996 | Policello et al. | |
| 7,399,350 B2 * | 7/2008 | Rajaraman et al. ........ | 106/31.59 |
| 7,507,775 B2 | 3/2009 | Leatherman et al. | |
| 7,652,072 B2 * | 1/2010 | Leatherman et al. ............. | 516/9 |
| 7,960,459 B2 * | 6/2011 | Noro et al. .................... | 524/195 |
| 2006/0228470 A1 | 10/2006 | He et al. | |
| 2007/0088091 A1 | 4/2007 | Leatherman | |
| 2007/0135329 A1 | 6/2007 | Wang et al. | |
| 2007/0249560 A1 | 10/2007 | Leatherman et al. | |
| 2008/0268146 A1 | 10/2008 | Su et al. | |
| 2008/0268162 A1 | 10/2008 | Borovik | |

FOREIGN PATENT DOCUMENTS

WO   WO0046311   8/2000

OTHER PUBLICATIONS

Hirohisa Maki, Shyuji Saeki, Isao Ikeda and Saburo Komori; "Syntheses and properties of surfactants containing organometals: IV. Organo silicone"; Journal of the American Oil Chemists' Society; vol. 46, No. 12 / Dec. 1969; Springer Berlin/Heidelberg / Germany.

* cited by examiner

*Primary Examiner* — Marc Zimmer
(74) *Attorney, Agent, or Firm* — Dominick G. Vicari; Joseph S. Ostroff

(57) ABSTRACT

A silane coating composition containing a silicon-based copolymer, a method for treating the surfaces of a metal such as steel, zinc-coated steels, or aluminum, to provide for the formation of a uniform conversion and/or passivation coating which increases the corrosion resistance of bare or painted metal and/or the adhesion properties of the metal, along with a metal having a conversion and/or passivation coating applied thereto are disclosed. Methods of the invention include contacting the requisite metal surface with an aqueous solution of a silane compound and a silicon-based polyether copolymer.

33 Claims, No Drawings

SILANE COATING COMPOSITIONS CONTAINING SILICON-BASED POLYETHER COPOLYMERS, METHODS FOR COATING METAL SURFACES AND ARTICLES MADE THEREFROM

CROSS REFERENCE TO RELATED APPLICATIONS

This application claims priority to U.S. provisional application 61/143,647, filed Jan. 9, 2009, which is herein incorporated by reference in its entirety.

FIELD OF THE INVENTION

The invention relates to non-chromium containing coatings for inorganic substrates, a method for coating the inorganic substrate and an article containing said cured coating. Particularly, the invention relates to a no-rinse, non-chromate, non-metal phosphate coating for metals including steel, zinc-coated steel, and aluminum surfaces comprising at least one silane and at least one silicon-based copolymer to improve leveling, flow, aesthetics and appearance and the adhesion of paints or other coatings to the surface of the metal and provide enhanced corrosion protection of the metal.

BACKGROUND OF THE INVENTION

A variety of compositions are known for commercial applications to improve adhesion to inorganic substrates and enhance corrosion protection of metal surfaces. For example, chromium and heavy metal phosphate conversion coatings are used in commercial applications to prepare metal surfaces prior to painting operations. However, growing concerns exist regarding the toxicity profile of chromium and the pollution effects of chromates, phosphates, and other heavy metals discharged into rivers and waterways from the waste streams of these industrial processes. Silane-based conversion coatings are replacing these chromium and heavy metal phosphate conversion coatings, but these silane-based coatings often exhibit non-uniform film thickness resulting in inadequate adhesion and metal surface corrosion protection.

Accordingly, there is a need in the art to provide an effective treatment with uniform film thickness to provide dried in place conversion or passivation coating to inhibit metal surface corrosion and enhance adhesion of paint on or other coatings that may be applied to the surface.

SUMMARY OF THE INVENTION

The invention pertains to a silane coating composition containing a silicon-based copolymer, a method for treating the surfaces of a metal such as steel, zinc-coated steels, and aluminum, to provide for the formation of a uniform coating, particularly a conversion or passivation coating which increases the corrosion resistance of bare or painted metal and/or the adhesion properties of the metal and an article comprising a metal substrate, conversion and/or passivation coating and a paint or other coating. The methods of the invention comprise contacting the requisite metal surface with an aqueous solution of silane compound and a silicon-based polyether copolymer. After contact of the metal surface with the above treatment, the treatment may be dried in place to form the desired coating. Preferably, the treatment is substantially free of chromium and phosphate.

In an embodiment, the invention is directed to a coating composition comprising
(a) at least one silane of the general formula (1):

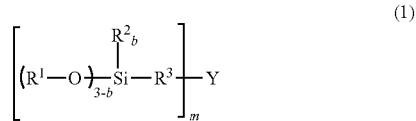

or hydrolyzates or condensates thereof
wherein
each occurrence of $R^1$ independently is a hydrogen atom or an acyl, a monovalent hydrocarbyl, or an alkoxy-substituted alkyl group each having from 1 to 16 carbon atoms;
each occurrence of $R^2$ independently is alkyl, alkoxy-substituted alkyl, aryl, or aralkyl group each having from 1 to 16 carbon atoms;
each occurrence of $R^3$ independently is a covalent chemical bond or a linear, branched or cyclic divalent organic group of from 1 to 12 carbon atoms;
each occurrence of Y independently is a mono-, di- or polyvalent organofunctional group of valence m;
each occurrence of subscripts a, b, m and n is independently an integer where a is 0 to 3; b is 0 to 2; and m is 1 to 4;
(b) at least one silicon-based polyether copolymer of the general formula (2):

$$(R^4)(R^5)(R^6)SiR^7Si(R^8)(R^9)[OSi(R^{10})(R^{11})]_xR^{12}$$
$$(C_2H_4O)_d(C_3H_6O)_e(C_4H_8O)_fR^{13} \quad (2)$$

wherein
each occurrence of $R^4$, $R^5$, $R^6$, $R^8$, $R^9$, $R^{16}$ and $R^{11}$ independently is a monovalent hydrocarbyl group of from 1 to 10 carbon atoms;
each occurrence of $R^7$ independently is a divalent hydrocarbylene group of 1 to 3 carbon atoms;
each occurrence of $R^{12}$ independently is a divalent organic group having the structure:

—$CH_2$—$CH(R^{14})(R^{15})_gO$— where each occurrence of $R^{14}$ independently is a hydrogen atom or methyl; each occurrence of $R^{15}$ independently is a divalent alkylene radical of from 1 to 6 carbon atoms; and the subscript g is 0 or 1;
each occurrence of $R^{13}$ independently is selected from the group consisting of a hydrogen atom, a monovalent hydrocarbon group, and an acyl group of from 1 to 6 carbon atoms; and
each occurrence of the subscripts d, e, f and x is an integer where d is 2 to 20, e is 0 to 18, f is 0 to 18 and x is 0 or 1 with the proviso that $2 \leq d+e+f \leq 20$; and
(c) water.
with the proviso that, where the composition comprises condensates of silane (1), it may have a degree of polymerization of between 2 and 50.

In another embodiment, the invention is directed to a method of treating a metal surface to form a coating thereon, comprising contacting the metal surface with the coating composition described above.

In yet another embodiment, the invention is directed to a metal having the coating composition described above applied thereto, along with painted metals having the coating composition applied thereto.

Other than in the working examples or where otherwise indicated, all numbers expressing amounts of materials, reaction conditions, time durations, quantified properties of materials, and so forth, stated in the specification and claims are to be understood as being modified in all instances by the term "about".

It will also be understood that any numerical range recited herein is intended to include all sub-ranges within that range and any combination of the various endpoints of such ranges or sub-ranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

DETAILED DESCRIPTION

In accordance with the invention, chrome-free, and preferably phosphate free, conversion or passivation coatings can be provided and metal surfaces such as electrogalvanized steel, cold-rolled steel, hot-dip galvanized steel, aluminum, and other metals containing these conversion or passivation coatings can be provided by contacting the desired surface with an aqueous solution of one or more unhydrolyzed, partially hydrolyzed or hydrolyzed silanes, a hydrolytically stable silicon-based polyether copolymer, water and optionally, a sol containing a colloidal oxide such as a metal oxide sol or a silica sol, a stabilizing agent, organosilicon compounds, and/or organic surfactants. In an aspect of the invention, a stabilizing agent is added to the silane mixture to enhance product stability and shelf life. Aqueous pretreatment compositions of the invention provide improved corrosion resistance of bare and painted metal, and adhesion of applied coatings to painted metal. The metal surface containing the conversion or passivation coatings of the present invention can further be treated with paint or other coating to provide for a painted surface with good adhesion between the paint or other coating and the bare metal.

The term "leveling" as defined herein is understood to refer to the ability of the applied coating to form a smooth film in which imperfections left by the applicator, such as a brush or roller, disappear during the drying process. The term "flow" as defined herein refers to the spreadability of the coating and to the ease with which the coating can be applied. The term "wetting" as described herein is the ability of a formulation to wet the surfaces of substrates efficiently without pinholes and defects.

In the context of the invention, the term "bare metal" refers to metal surfaces that are treated with the conversion or passivation coating of the invention but which have not been painted.

The silane coating composition of the invention containing a silicon-based copolymer comprises, (a) at least one silane of the general formula (1):

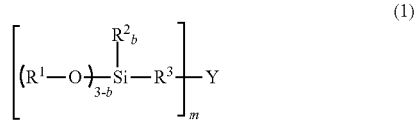

(1)

or hydrolyzates or condensates thereof
wherein
each occurrence of $R^1$ independently a hydrogen atom or an acyl, a monovalent hydrocarbyl, or an alkoxy-substituted alkyl group of from 1 to 16 carbon atoms;

each occurrence of $R^2$ independently is alkyl, alkoxy-substituted alkyl, aryl, or aralkyl group each having from 1 to 16 carbon atoms;

each occurrence of $R^3$ independently is a covalent chemical bond or a linear, branched or cyclic divalent organic group of from 1 to 12 carbon atoms;

each occurrence of Y independently is a mono-, di- or polyvalent organofunctional group of valence m;

each occurrence of subscripts a, b, m and n is independently an integer where a is 0 to 3; b is 0 to 2; and m is 1 to 4;

(b) at least one silicon-based polyether copolymer of the general formula (2):

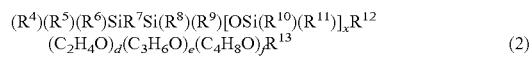

(2)

wherein
each occurrence of $R^4$, $R^5$, $R^6$, $R^8$, $R^9$, $R^{10}$ and $R^{11}$ independently is a monovalent hydrocarbyl group of from 1 to 10 carbon atoms;

each occurrence of $R^7$ independently is a divalent hydrocarbylene group of 1 to 3 carbon atoms;

each occurrence of $R^{12}$ is independently a divalent organic group having the structure:

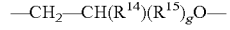

where each occurrence of $R^{14}$ independently is hydrogen atom or methyl; each occurrence of $R^{15}$ independently is a divalent alkylene radical of from 1 to 6 carbon atoms; and the subscript g is 0 or 1;

each occurrence of $R^{13}$ independently is selected from the group consisting of A hydrogen atom, a monovalent hydrocarbon group, and an acyl group of from 1 to 6 carbon atoms; and each occurrence of the subscripts d, e, f and x is an integer where d is 2 to 20, e is 0 to 18, f is 0 to 18 and x is 0 or 1 with the proviso that $2 \leq d+e+f \leq 20$; and (c) water.

with the proviso that, where the composition comprises condensates of silane (1), it may have a degree of polymerization of between 2 and 50.

As used herein, the notation, $(\text{—O—})_{0.5}$, refers to one half of a siloxane group, Si—O—Si. Thus, the $(\text{—O—})_{0.5}$ siloxane group forms chemical bonds with two separate silicon atoms and holds these two separate silicon atoms together, whether these silicon atoms occur intermolecularly or intramolecularly. Because $(\text{—O—})_{0.5}$, refers to one half of a siloxane group, Si—O—Si, in the general formula (1), the $(\text{—O—})_{0.5}$ group must always be matched with another $(\text{—O—})_{0.5}$ group so that the two $(\text{—O—})_{0.5}$ groups can be combined to form a Si—O—Si group.

As used herein, monovalent hydrocarbon groups include straight chain, branched and cyclic alkyl, alkenyl and alkynyl groups, aralkyl groups and aryl groups. Specific non-limiting examples of alkyl include methyl, ethyl, propyl and isobutyl. Specific non-limiting examples of alkenyl include vinyl, propenyl, allyl and methallyl. Specific non-limiting examples of alkynyls include acetylenyl, propargyl and methylacetylenyl. Specific non-limiting examples of aralkyl include benzyl and phenethyl. Specific non-limiting example of aryl includes phenyl.

As used herein, divalent hydrocarbon groups include straight chain, branched and cyclic alkylene, alkenylene and alkynylene groups, aralkylene groups and arylene groups. Specific non-limiting examples of alkylene include methylene, ethylene, propylene and isobutylene. Specific non-limiting examples of alkenylene include ethenylene and propenylene. Specific non-limiting examples of alkynylenes include acetylenylene, propargylene and methylacetylenylene. Specific non-limiting examples of aralkylene include xylenylene. A specific non-limiting example of arylene includes phenylene.

The term "substituted" aliphatic or aromatic refers to an aliphatic or aromatic group wherein the carbon backbone may have a heteroatom located within the backbone or a heteroatom or heteroatom-containing group attached to the carbon backbone.

The term "organic group" refers to an aliphatic hydrocarbon group, aromatic hydrocarbon group, or substituted aliphatic or substituted aromatic group.

Silane (a) of General Formula (1) of the Coating Composition

Silane (a) of general formula (1) of the coating composition interacts with the metal surface to provide adhesion and inhibit corrosion and with paints or other coatings to enhance the adhesion to the bare metal.

The symbol Y in formula (1) is an organofunctional group that is capable of interacting with the metal, paint or other coatings. The organofunctional groups have a valence of from 1 to 4 and are connected to the silicon atom through a divalent $R^3$ group.

Univalent organofunctional groups herein include, but are not limited to, amino ($-NR^{16}_2$), diamino ($-N(R^{16})R^3NR^{16}_2$), mercapto ($-SH$), acryloxy ($CH_2=CHCO_2-$), methacryloxy ($CH_2=C(CH_3)CO_2-$), acetoxy ($CH_3CO_2-$), glycidoxy ($-O-CH_2-C_2H_3O$), epoxycyclohexyl ($-C_6H_9O$), epoxy ($-CR^{16}$  ($-O-$)$CR^{16}_2$), hydroxyl ($HO-$), dithiocarbonate ($-SC(=O)SR^{16}$), trithiocarbonate ($-SC(=S)SR^{16}$), carbamate ($-NR^{16}(C=O)OR^{16}$), thioester ($-S(C=O)R^{16}$), thiocarbamate ($-NR^{16}(C=O)SR^{16}$), dithiocarbamate ($-NR^{16}(C=S)SR^{16}$), urethane ($-O(C=O)NR^{16}R^{16}$), univalent ureido ($-NR^{16}(C=O)NR^{16}_2$), silyl ($-Si(R^2)_b(OR^1)_{3-a-b}(-O-)_{0.5a}$) and isocyanurato (($-N)(NR^{16})(NR^{16})C_3O_3$) where each occurrence of $R^{16}$ is independently selected from the group consisting of hydrogen and straight chain, branched and cyclic alkyl, alkenyl or aryl of from 1 to 6 carbon atoms and a and b are defined above.

Divalent organofunctional groups herein include, but are not limited to, sulfide ($-S-$), disulfide ($-SS-$), trisulfide ($-SSS-$), tetrasulfide ($-SSSS-$), carbamate ($-_2N(C=O)OR^{16}$ or $-R^{16}N(C=O)O-$), ureido ($-_2N(C=O)NR^{16}_2$ or $-NR^{16}(C=O)N-R^{16}$), and isocyanurato (($-N)_2(NR^{16})C_3O_3$) where each occurrence of $R^{16}$ is independently selected from the group consisting of hydrogen and straight chain, branched and cyclic alkyl, alkenyl or aryl of from 1 to 6 carbon atoms and a and b are defined above.

Trivalent organofunctional groups herein include, but are not limited to, carbamate ($-_2N(C=O)O-$), ureido ($-NR^{16}(C=O)N-_2$), and isocyanurato (($-N)_3C_3O_3$))

Tetravalent organofunctional groups herein include, but are not limited to, ureido ($-_2N(C=O)N-_2$).

Representative non-limiting examples of $R^1$ are hydrogen, ethyl, methyl, propyl, iso-propyl, butyl, iso-butyl, sec-butyl, and acetyl. Representative non-limiting examples of $R^2$ are methyl, ethyl, butyl, hexyl, phenyl, and benzyl. Representative non-limiting examples of $R^3$ are a chemical bond, methylene, ethylene, propylene, butylenes, hexylene and decylene, ethenylene, propenylene, butenylene, hexenylene, phenylene, 3-oxa-pentylene, and 4-oxaheptylene.

Illustrative examples of silane (a) are those where $R^1$ is hydrogen, methyl or ethyl; $R^2$ is methyl; $R^3$ is methylene, ethylene and propylene; and Y is ureido, epoxy or tetrasulfide. Illustratively, Y is ureido where $R^{16}$ is hydrogen or methyl.

Representative, non-limiting examples of silane (a) include vinylmethyldiethoxysilane, vinyltrimethoxysilane, vinyldimethylethoxysilane, vinyltriethoxysilane, vinyltripropoxysilane, vinyl-tris(2-methoxyethoxysilane), styrylethyltrimethoxysilane, gamma-acryloxypropyltrimethoxysilane, gamma-(acryloxypropyl)methyldimethoxysilane, gamma-methacryloxypropyltrimethoxysilane, gamma-methacryloxypropyltriethoxysilane, gamma-methacryloxypropylmethyldimethoxysilane, gamma-methacryloxypropylmethyldiethoxysilane, gamma-methacryloxypropyl-tris-(2-methoxyethoxy)silane, beta-(3,4-epoxycyclohexyl)ethyltrimethoxysilane, beta-(3,4-epoxycyclohexyl)ethyltriethoxysilane, gamma-glycidoxypropyl trimethoxysilane, gamma-glycidoxypropyl triethoxysilane, gamma-glycidoxypropyl methyldiethoxysilane, gamma-glycidoxypropyl methyldimethoxysilane, gamma-mercaptopropyl trimethoxysilane, gamma-mercaptopropyltriethoxysilane, gamma-thiooctanoylpropyltrimethoxysilane, gamma-thiooctanoylpropyltriethoxysilane, bis-(trimethoxysilylpropyl) tetrasulfane, bis-(triethoxysilylpropyl) disulfane, gamma-ureidopropyltrimethoxysilane, gamma-ureidopropyl triethoxysilane, gamma-ureidopropyldi methoxyethoxysilane, gamma-ureidopropylmethoxydiethoxysilane, gamma-ureidopropylmethyldimethoxysilane, gamma-ureidopropylmethyl diethoxysilane, gamma-ureidopropylmethylmethoxyethoxysilane, gamma-carbamatopropyl trimethoxysilane, gamma-carbamatopropyl triethoxysilane, N,N',N"-tris-(3-trimethoxysilylpropyl)isocyanurate, bis-(trimethoxysilylpropyl)urea, bis-(triethoxysilylpropyl)urea, and partial or complete hydrolyzates thereof.

Illustratively, silane (a) may include gamma-ureidopropyltrimethoxysilane, gamma-ureidopropyltriethoxysilane, gamma-ureidopropyldimethoxyethoxysilane, gamma-ureidopropylmethoxydiethoxysilane, gamma-ureidopropylmethyldimethoxysilane, gamma-ureidopropylmethyldiethoxysilane, gamma-ureidopropylmethylmethoxyethoxysilane, N,N'-bis-(3-triethoxysilylpropyl)urea, N,N'-bis-(3-trimethoxysilylpropyl)urea, N,N'-bis-(3-diethoxymethylsilylpropyl)urea, N,N'-bis-(3-diisopropoxymethylsilylpropyl)urea, N,N-bis-(3-triethoxysilylpropyl)urea, N,N-bis-(3-trimethoxysilylpropyl)urea, N,N-bis-(3-diethoxymethylsilylpropyl)urea, N,N-bis-(3-diisopropoxymethylsilylpropyl)urea, N,N,N'-tris-(3-triethoxysilylpropyl)urea, N,N,N'-tris-(3-trimethoxysilylpropyl)urea, N,N,N'-tris-(3-diethoxymethylsilylpropyl)urea, N,N,N'-tris-(3-diisopropoxysilylpropyl)urea, N,N,N',N'-tetrakis-(3-triethoxysilylpropyl)urea, N,N,N',N'-tetrakis-(3-trimethoxysilylpropyl)urea, N,N,N',N'-tetrakis-(3-diethoxymethylsilylpropyl)urea, N,N,N',N'-tetrakis-(3-diisopropoxymethylsilylpropyl)urea, tris-(3-trimethoxysilylpropyl)isocyanurate, and partial or complete hydrolyzates thereof.

For example, silane (a) includes unhydrolyzed, partially hydrolyzed and hydrolyzed gamma-ureidopropyltrimethoxysilane and gamma-ureidopropyltriethoxysilane. Gamma-ureidopropyltrimethoxysilane and gamma-ureidopropyltriethoxysilane are commercially available under the designation Silquest* A-1524 silane and Silquest* A-1160 silane, sold as a 50 percent active silane in methanol, respectively, from Momentive Performance Materials.

The coating compositions described herein can contain the silane (a) in an amount of specifically from 0.01 to 80 weight percent, more specifically of from 0.1 to 60 weight percent and most specifically of from 1 to 40 weight percent, said weight percents being based upon the total weight of the composition.

Silicon-Based Polyether Copolymer (b) of General Formula (2) of the Coating Composition The silicon-based polyether copolymer (b) provides for a uniform conversion or passivation coating on the metal surface. The preparation of the silicon-based polyether copolymer is known in the art. For example, the preparation of these compounds is described in U.S. Pat. No. 7,507,775 and U.S. Patent Application Publication No. US 2007/0249560 A1, both documents incorporated by reference herein in their entireties.

One method of producing the composition of the present invention is to react a molecule of the following formula (3) or (4):

$(R^4)(R^5)(R^6)SiR^7Si(R^8)(R^9)OSi(R^{10})(R^{11})(H)$ (3)

$(R^4)(R^5)(R^6)SiR^7Si(R^8)(R^9)(H)$ (4)

wherein
each occurrence of $R^4$, $R^5$, $R^6$, $R^8$, $R^{10}$ and $R^{11}$ independently is a monovalent hydrocarbyl group of from 1 to 10 carbon atoms;
each occurrence of $R^7$ independently is a divalent hydrocarbylene group of 1 to 3 carbon atoms;
under hydrosilylation conditions, with an olefinically modified polyalkyleneoxide. As used herein the phrase "olefinically modified polyalkyleneoxide" refers to a molecule possessing one or more alkyleneoxide groups containing one or more, terminal or pendant, carbon-carbon double bonds. The polyether is an olefinically modified polyalkyleneoxide is described by the general formula (5):

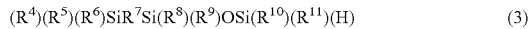
(5)

wherein
each occurrence of $R^{13}$ independently is selected from the group consisting of hydrogen atom, monovalent hydrocarbon group of 1 to 6 carbon atoms and acyl group of 1 to 6 carbon atoms;
each occurrence of $R^{14}$ is independently hydrogen atom or methyl;
each occurrence of $R^{15}$ is a divalent alkylene radical of 1 to 6 carbons;
each occurrence of the subscripts d, e, f and g is an integer where d is 2 to 20, e is 0 to 18, f is 0 to 18 and g is 0 or 1 with the proviso that $2 \leq d+e+f \leq 20$.

When the polyether is composed of mixed oxyalkyleneoxide groups (i.e. oxyethylene, oxypropylene and oxybutylene) the units may be blocked, or randomly distributed. One skilled in the art will understand the advantages of using a blocked or random configuration.

Illustrative examples of the polyether are provided below, but not limited to: $CH_2=CHCH_2O(CH_2CH_2O)_8H$; $CH_2=CHCH_2O(CH_2CH_2O)_8CH_3$; $CH_2=CHCH_2O(CH_2CH_2O)_4(CH_2CH(CH_3)O)_5H$; $CH_2=CHO(CH_2CH_2O)_5(CH_2CH(CH_3)O)_5H$; $CH_2=C(CH_3)CH_2O(CH_2CH_2O)_4(CH_2CH(CH_3)O)_5C(=O)CH_3$; and $CH_2=CHCH_2O(CH_2CH_2O)_5(CH_2CH(CH_3)O)_2(CH_2CH(CH_3)O)_2H$.

Polyether modified siloxanes may be prepared as is known in the art through the use of a hydrosilylation reaction to graft the olefinically modified (i.e. vinyl, allyl or methallyl) polyalkyleneoxide onto the hydride (SiH) intermediate of the disiloxane of the present invention.

Precious metal catalysts suitable for making polyether-substituted siloxanes are also well known in the art and comprise complexes of rhodium, ruthenium, palladium, osmium, iridium, and/or platinum. Many types of platinum catalysts for this SiH olefin addition reaction are known and such platinum catalysts may be used to generate the compositions of the present invention. The platinum compound can be selected from those having the formula ($PtCl_2Olefin$) and $H(PtCl_3Olefin)$ as described in U.S. Pat. No. 3,159,601, hereby incorporated by reference. A further platinum containing material can be a complex of chloroplatinic acid with up to 2 moles per gram of platinum of a member selected from the class consisting of alcohols, ethers, aldehydes and mixtures thereof as described in U.S. Pat. No. 3,220,972 hereby incorporated by reference. Yet another group of platinum containing materials useful in this present invention is described in U.S. Pat. Nos. 3,715,334; 3,775,452 and 3,814,730 (Karstedt). Additional background concerning the art may be found in J. L. Spier, "Homogeneous Catalysis of Hydrosilation by Transition Metals", in Advances in Organometallic Chemistry, volume 17, pages 407 through 447, F. G. A. Stone and R. West editors, published by Academic Press (New York, 1979). Those skilled in the art can easily determine an effective amount of platinum catalyst. Generally, an effective amount of platinum catalyst ranges from about 0.1 to 50 parts per million of the total organomodified disiloxane composition.

The substituents of formula (2) of silicon-based polyether copolymer (b) have been described above. Illustratively, for silicon-based polyether copolymer (b), $R^4$, $R^5$, $R^6$, $R^8$ and $R^9$ is an alkyl group of from 1 to 6 carbon atoms; $R^7$ is an alkylene group of 1 to 3 carbon atoms; $R^{12}$ is $-CH_2CH_2CH_2O-$ or $-CH_2CH(CH_3)CH_2O-$; $R^{13}$ is an hydrogen atom, an alkyl group of from 1 to 6 carbon atoms or an acetyl group; d is 3 to 10; e is 0 to 10 and f is 0 to 8. Illustratively, silicon-based polyether copolymer (b) is where $R^4$, $R^5$, $R^6$, $R^8$ and $R^9$ is methyl, ethyl, propyl, isopropyl or isobutyl; $R^7$ is ethylene; $R^{12}$ is $-CH_2CH_2CHO-$; $R^{13}$ is an hydrogen atom, methyl or an acetyl group; d is 5 to 8; e is 0 to 5; f is 0 to 2. Yet another example of the silicon-based polyether copolymer (b) is where $R^4$, $R^5$, $R^6$, $R^8$ and $R^9$ is methyl; and d is 5 to 8; e is 0 to 3, f is 0 and x is 0.

Representative and non-limiting examples of the silicon-based polyether copolymer (b) are, $(CH_3)_3SiCH_2Si(CH_3)_2CH_2CH_2O(CH_2CH_2O)_2H$, $(CH_3)_3SiCH_2CH_2Si(CH_3)_2CH_2CH_2O(CH_2CH_2O)_3CH_3$, $(CH_3)_3SiCH_2CH_2Si(CH_3)_2CH_2CH_2CH_2O(CH_2CH_2O)_7CH_3$, $(CH_3)_3SiCH_2CH_2Si(CH_3)_2CH_2CH_2CH_2O(CH_2CH_2O)_{20}CH_3$, $(CH_3)_3SiCH_2CH_2Si(CH_3)_2CH_2CH(CH_3)CH_2O(CH_2CH_2O)_4CH_3$, $(CH_3)_3SiCH_2CH_2Si(CH_3)_2CH_2CH_2O(CH_2CH_2O)_4(CH_2CH(CH_3)O)_1CH_3$, $(CH_3CH_2)_3SiCH_2CH_2Si(CH_2CH_3)_2CH_2CH_2O(CH_2CH_2O)_4(CH_2CH(CH_3)O)_1CH_3$, $(CH_3CH_2CH_2)_3SiCH_2CH_2Si(CH_2CH_2CH_3)_2CH_2CH_2O(CH_2CH_2O)_4(CH_2CH(CH_3)O)_1CH_3$, $(CH_3)_2(CH_3CH_2CH_2)SiCH_2CH_2Si(CH_3)_2CH_2CH_2O(CH_2CH_2O)_4(CH_2CH(CH_3)O)_1CH_3$, $(CH_3)_2(C_6H_5CH_2CH_2)SiCH_2CH_2Si(CH_3)_2CH_2CH_2O(CH_2CH_2O)_7(CH_2CH(CH_3)O)_1CH_3$, $(CH_3)_3SiCH_2CH_2Si(CH_3)_2CH_2CH_2CH_2O(CH_2CH_2O)_5(CH_2CH(CH_3)O)_2CH_3$, $(CH_3)_3SiCH_2CH_2Si(CH_3)_2CH_2CH_2CH_2O(CH_2CH_2O)_{15}(CH_2CH(CH_3)O)_5H$, $(CH_3)_3SiCH_2CH_2Si(CH_3)_2CH_2CH_2CH_2O(CH_2CH_2O)_2(CH_2CH(CH_3)O)_{18}CH_3$, $(CH_3)_3SiCH_2CH_2Si(CH_3)_2CH_2CH_2CH_2O(CH_2CH_2O)_8(CH_2CH(CH_3)O)_3CH_3$, $(CH_3)_3SiCH_2CH_2Si(CH_3)_2CH_2CH_2CH_2O(CH_2CH_2O)_4(CH_2CH (CH$_2$CH$_3$)O)$_1$CH$_3$, (CH$_3$)$_3$SiCH$_2$CH$_2$Si(CH$_3$)$_2$ CH$_2$CH$_2$CH$_2$O(CH$_2$CH$_2$O)$_{10}$(CH$_2$CH(CH$_2$CH$_3$)O)$_5$CH$_3$, (CH$_3$)$_3$SiCH$_2$CH$_2$Si(CH$_3$)$_2$CH$_2$CH$_2$CH$_2$O(CH$_2$CH$_2$O)$_{10}$ (CH$_2$CH(CH$_2$CH$_3$)O)$_{10}$C(=O)CH$_3$, (CH$_3$)$_3$SiCH$_2$CH$_2$Si (CH$_3$)$_2$CH$_2$CH$_2$O(CH$_2$CH$_2$O)$_4$(CH$_2$CH(CH$_3$)O)$_1$(CH$_2$CH (CH$_2$CH$_3$)O)H, (CH$_3$)$_3$SiCH$_2$CH$_2$Si(CH$_3$)$_2$CH$_2$CH$_2$O (CH$_2$CH$_2$O)$_8$(CH$_2$CH(CH$_3$)O)$_5$(CH$_2$CH(CH$_2$CH$_3$)O)H, (CH$_3$)$_3$SiCH$_2$CH$_2$Si(CH$_3$)$_2$CH$_2$CH$_2$CH$_2$O(CH$_2$CH$_2$O)$_4$ (CH$_2$CH(CH$_3$)O)$_1$CH$_3$, (CH$_3$)$_3$SiCH$_2$CH$_2$Si(CH$_3$)$_2$ CH$_2$CH$_2$O(CH$_2$CH$_2$O)$_4$CH$_3$, (CH$_3$)$_3$SiCH$_2$CH$_2$Si (CH$_3$)$_2$CH$_2$CH$_2$O(CH$_2$CH$_2$O)$_5$C(=O)CH$_3$, (CH$_3$)$_3$ SiCH$_2$CH$_2$CH$_2$Si(CH$_3$)$_2$CH$_2$CH$_2$O(CH$_2$CH$_2$O)$_4$(CH$_2$CH (CH$_3$)O)$_1$CH$_3$, (CH$_3$CH$_2$)$_3$SiCH$_2$CH$_2$CH$_2$Si(CH$_2$CH$_3$)$_2$ CH$_2$CH$_2$O(CH$_2$CH$_2$O)$_4$(CH$_2$CH(CH$_3$)O)$_1$CH$_3$, (CH$_3$)$_3$ SiCH$_2$CH$_2$CH$_2$Si(CH$_3$)$_2$CH$_2$CH$_2$CH$_2$O(CH$_2$CH$_2$O)$_4$ (CH$_2$CH(CH$_3$)O)$_1$CH$_3$, (CH$_3$)$_3$SiCH$_2$Si(CH$_3$)$_2$(OSi(CH$_3$)$_2$) CH$_2$CH$_2$O(CH$_2$CH$_2$O)$_2$H, (CH$_3$)$_3$SiCH$_2$CH$_2$Si(CH$_3$)$_2$(OSi (CH$_3$)$_2$)CH$_2$CH$_2$O(CH$_2$CH$_2$O)$_3$CH$_3$, (CH$_3$)$_3$SiCH$_2$CH$_2$Si (CH$_3$)$_2$(OSi(CH$_3$)$_2$)CH$_2$CH$_2$CH$_2$O(CH$_2$CH$_2$O)$_7$CH$_3$, (CH$_3$)$_3$ SiCH$_2$CH$_2$Si(CH$_3$)$_2$(OSi(CH$_3$)$_2$)CH$_2$CH$_2$CH$_2$O (CH$_2$CH$_2$O)$_{20}$CH$_3$, (CH$_3$)$_3$SiCH$_2$CH$_2$Si(CH$_3$)$_2$(OSi(CH$_3$)$_2$) CH$_2$CH(CH$_3$)CH$_2$O(CH$_2$CH$_2$O)$_4$CH$_3$, (CH$_3$)$_3$SiCH$_2$CH$_2$Si (CH$_3$)$_2$(OSi(CH$_3$)$_2$)CH$_2$CH$_2$O(CH$_2$CH$_2$O)$_4$(CH$_2$CH(CH$_3$) O)$_1$CH$_3$, (CH$_3$CH$_2$)$_3$SiCH$_2$CH$_2$Si(CH$_2$CH$_3$)$_2$(OSi(CH$_3$)$_2$) CH$_2$CH$_2$O(CH$_2$CH$_2$O)$_4$(CH$_2$CH(CH$_3$)O)$_1$H, (CH$_3$CH$_2$CH$_2$)$_3$SiCH$_2$CH$_2$Si(CH$_2$CH$_2$CH$_3$)$_2$(OSi(CH$_3$)$_2$) CH$_2$CH$_2$O(CH$_2$CH$_2$O)$_4$—(CH$_2$CH(CH$_3$)O)$_1$CH$_3$, (CH$_3$)$_2$ (CH$_3$CH$_2$CH$_2$)SiCH$_2$CH$_2$Si(CH$_3$)$_2$(OSi(CH$_3$)$_2$)CH$_2$CH$_2$O (CH$_2$CH$_2$O)$_4$—(CH$_2$CH(CH$_3$)O)$_1$CH$_3$, (CH$_3$)$_2$ (C$_6$H$_5$CH$_2$CH$_2$)SiCH$_2$CH$_2$Si(CH$_3$)$_2$(OSi(CH$_3$)$_2$)CH$_2$CH$_2$- (CH$_2$CH$_2$O)$_7$(CH$_2$CH(CH$_3$)O)$_1$CH$_3$, (CH$_3$)$_3$SiCH$_2$CH$_2$Si (CH$_3$)$_2$(OSi(CH$_3$)$_2$)CH$_2$CH$_2$CH$_2$O(CH$_2$CH$_2$O)$_5$(CH$_2$CH (CH$_3$)O)$_2$CH$_3$, (CH$_3$)$_3$SiCH$_2$Si(CH$_3$)$_2$(OSi(CH$_3$)$_2$) CH$_2$CH$_2$CH$_2$O(CH$_2$CH$_2$O)$_{15}$(CH$_2$CH(CH$_3$)O)$_5$H, (CH$_3$)$_3$ SiCH$_2$CH$_2$Si(CH$_3$)$_2$(OSi(CH$_3$)$_2$)CH$_2$CH$_2$CH$_2$O (CH$_2$CH$_2$O)$_2$(CH$_2$CH(CH$_3$)O)$_{18}$CH$_3$, (CH$_3$)$_3$SiCH$_2$Si (CH$_3$)$_2$(OSi(CH$_3$)$_2$)CH$_2$CH$_2$CH$_2$O(CH$_2$CH$_2$O)$_8$(CH$_2$CH (CH$_3$)O)$_3$CH$_3$, (CH$_3$)$_3$SiCH$_2$CH$_2$Si(CH$_3$)$_2$(OSi(CH$_3$)$_2$) CH$_2$CH$_2$CH$_2$O(CH$_2$CH$_2$O)$_4$—(CH$_2$CH(CH$_2$CH$_3$)O)$_1$CH$_3$, (CH$_3$)$_3$SiCH$_2$CH$_2$Si(CH$_3$)$_2$(OSi(CH$_3$)$_2$)CH$_2$CH$_2$CH$_2$O (CH$_2$CH$_2$O)$_{10}$—(CH$_2$CH(CH$_2$CH$_3$)O)$_5$CH$_3$, (CH$_3$)$_3$ SiCH$_2$CH$_2$Si(CH$_3$)$_2$(OSi(CH$_3$)$_2$)CH$_2$CH$_2$CH$_2$O (CH$_2$CH$_2$O)$_{10}$—(CH$_2$CH(CH$_2$CH$_3$)O)$_{10}$C(=O)CH$_3$, (CH$_3$)$_3$ SiCH$_2$CH$_2$Si(CH$_3$)$_2$(OSi(CH$_3$)$_2$)CH$_2$CH$_2$O (CH$_2$CH$_2$O)$_4$(CH$_2$CH(CH$_3$)O)$_1$—(CH$_2$CH(CH$_2$CH$_3$)O)H, (CH$_3$)$_3$ SiCH$_2$CH$_2$Si(CH$_3$)$_2$(OSi(CH$_3$)$_2$)CH$_2$CH$_2$O (CH$_2$CH$_2$O)$_8$ —(CH$_2$CH(CH$_3$)O)$_5$(CH$_2$CH(CH$_2$CH$_3$)O)H, (CH$_3$)$_3$ SiCH$_2$CH$_2$Si(CH$_3$)$_2$(OSi(CH$_3$)$_2$)CH$_2$CH$_2$CH$_2$O (CH$_2$CH$_2$O)$_4$(CH$_2$CH(CH$_3$)O)$_1$CH$_3$, (CH$_3$)$_3$ SiCH$_2$CH$_2$CH$_2$Si(CH$_3$)$_2$(OSi(CH$_3$)$_2$)CH$_2$CH$_2$O (CH$_2$CH$_2$O)$_4$CH$_3$, (CH$_3$)$_3$SiCH$_2$CH$_2$CH$_2$Si(CH$_3$)$_2$(OSi (CH$_3$)$_2$)CH$_2$CH$_2$O(CH$_2$CH$_2$O)$_5$C(=O)CH$_3$, (CH$_3$)$_3$ SiCH$_2$CH$_2$CH$_2$Si(CH$_3$)$_2$(OSi(CH$_3$)$_2$)CH$_2$CH$_2$O (CH$_2$CH$_2$O)$_4$(CH$_2$CH(CH$_3$)O)$_1$CH$_3$, (CH$_3$CH$_2$)$_3$ SiCH$_2$CH$_2$CH$_2$Si(CH$_2$CH$_3$)$_2$(OSi(CH$_3$)$_2$)CH$_2$CH$_2$O (CH$_2$CH$_2$O)$_4$—(CH$_2$CH(CH$_3$)O)$_1$CH$_3$, (CH$_3$)$_3$ SiCH$_2$CH$_2$CH$_2$Si(CH$_3$)$_2$(OSi(CH$_3$)$_2$)CH$_2$CH$_2$CH$_2$O (CH$_2$CH$_2$O)$_4$—(CH$_2$CH(CH$_3$)O)$_1$CH$_3$, and mixtures thereof.

The composition described herein can contain the silicon-based polyether copolymer (b) in an amount of specifically from 0.001 to 10 weight percent, more specifically of from 0.01 to 3 weight percent and most specifically of from 0.1 to 0.5 weight percent, said weight percents being based upon the total weight of the composition.

Water (c)

The water can be from many sources, including tap water, well water, distilled water, deionized water and the like. It is preferred that the water be distilled or deionized, in order to avoids salts, such as calcium carbonate or magnesium carbonate, that are often found in tap water and well water. These salts may inhibit the interactions of silane (a) and the silicon-based polyether (b) with the metal surface.

The composition described herein can contain the water (c) in an amount of from 1 to 99.99 weight percent, more specifically of from 2 to 99.9 weight percent and most specifically of from 80 to 95 weight percent, said weight percents being based upon the total weight of the composition.

Other Components

In addition to the silane (a), silicon-based polyether copolymer (b) and water (c), other components can be used in the coating compositions of the invention that may further improve the adhesion, inhibit corrosion, and add to the shelf stability of the conversion or passivation coatings. The other components include, but are not limited to, colloidal oxides, stabilizing agents, organosilicon compounds and organic surfactants.

Colloidal Oxides

Colloidal oxides that are useful as components of the conversion or passivation coating compositions include stabilized aqueous colloidal silica (also referred to as silica sols) or colloidal metal oxide. Colloidal metal oxides, also referred to as metal oxide sols, include the non-limiting examples such as cerium oxide (CeO$_2$), zinc oxide (ZnO), zirconium dioxide (ZrO$_2$), titanium dioxide (TiO$_2$), aluminum oxide (Al$_2$O$_3$) and combinations thereof.

The silica sol material comprises aqueous colloidal silica preferably with acidic pH. Exemplary silica sol materials may be purchased from Cabot Corporation and from other suppliers such as Wacker Chemie, Degussa, Nissan Chemical, and Nalco Chemical Company. An example of a silica sol, Cab-O-Sperse A205, is an aqueous dispersion of high purity fumed silica in deionized water. This sol has a pH of about 5-7 and a solids content of about 12%. The viscosity is less than 100 cPs and the specific gravity is about 1.07.

Exemplary cerium oxide sols are also commercially available. Generally, these comprise cerium oxide particles in aqueous colloidal suspension. Commercially available cerium oxide sols that may be mentioned as exemplary include colloidal cerium oxide nitrate and cerium oxide acetate, both available from Rhodia and those available from Nyacol Nano Technologies Inc. The preferred cerium oxide acetate sol includes about 20 weight percent cerium oxide particles. Exemplary cerium oxide sols include those having particle sizes of specifically less than about 100 nanometers (nm), more specifically less than about 50 nanometers and most specifically less than about 20 nanometers. Non-limiting exemplary pHs of cerium oxide sols are those having pH values specifically of on the order of about 1 to 9, more specifically 1 to 6 and most specifically 2 to 4. Colloidal metal oxide can comprise any other colloidal metal oxide other than silica particles, i.e., nanosized silica particles, zinc oxide particles, i.e., nanosized zinc oxide particles, and/or aluminum oxide particles, i.e., nanosized aluminum oxide particles mentioned above. Aqueous colloidal suspensions of metal oxides can further comprise silica, more specifically silica sol.

The composition described herein can contain colloidal oxides in an amount of from 0.001 to 36 weight percent, more specifically of from 0.01 to 30 weight percent and most specifically of from 0.1 to 20 weight percent, said weight percents being based upon the total weight of the composition.

Stabilizing Agents

A "stabilizing agent" as used herein shall be understood to be a substance which is soluble in water and retards precipitation or gelation of the condensate. The solubility of the stabilizing agent in water is such that there is at least no visible phase separation resulting from the formation of at least two distinct layers of the stabilizing agent and the aqueous composition.

The solubility of the stabilizing agent in water can be from 1 weight percent to complete miscibility, and more specifically from about 2 to about 50 weight percent, said weight percents being based on the total weight of the stabilizing agent and water solution. The retardation of the precipitation or gelation of the condensate involves eliminating any visible precipitation or gelation for a period of time from the composition as compared to an equivalent composition except for said stabilizing agent that would have said precipitation or gelation within the same time period.

The stabilizing agent when used in a stability-increasing amount provides for a period of stability for said composition, which is at least two times that of an equivalent composition having no added stabilizing agent. In a further more specific embodiment, the stabilizing agent provides a period of stability for said composition which is at least three times that of an equivalent composition having no added stabilizing agent. In a most specific embodiment, the stabilizing agent provides a period of stability for said composition, which is at least five times that of an equivalent composition having no added stabilizing agent. The stabilizing agent can provide for a period of stability of the composition of from about 1 hour to about 5 years, more specifically from about 48 hours to about 3 years, even more specifically of from 96 hours to about 2 years, and most specifically of from about 1 week to about 18 months.

A host of stabilizing agents may be mentioned as illustrative, including, for example, alcohols, glycols, triols, polyols, glycol ethers, esters, ketones, pyrrolidones, and polyethersilanes.

Specific stabilizers include: ethanol, 1-propanol, 2-propanol (i-propanol), 2-methyl-1-propanol (i-butanol), 2-methyl-2-propanol (tert-butanol), 1-butanol, 2-butanol, 2-methyl-1-butanol, 2-methyl-2-butanol, 2,2-dimethyl-1-propanol, 1-pentanol, 2-pentanol, 4-methyl-2-pentanol; glycols including: propylene glycol, 1,3-butanediol, 1,4-butanediol, 2-methyl-1,3-propanediol, 2-methyl-2,4-pentanediol (hexylene glycol), diethylene glycol, triethylene glycol, tetraethylene glycol, poly(ethylene glycol), dipropylene glycol, tripropylene glycol, poly(propylene glycol), 1,5-pentanediol, esterdiol 204, 2,2,4-trimethylpentanediol, 2-ethyl-1,3-hexanediol, glycerol, glycerol ethoxylate, glycerol ethoxylate-co-propoxylate triol, glycerol propoxylate, pentaerythritol, glycol ethers such as 1-methoxy-2-propanol (propylene glycol methyl ether), 1-ethoxy-2-propanol, 1-propoxy-2-propanol, 1-butoxy-2-propanol, 2-methoxyethanol, 2-ethoxyethanol, 2-propoxyethanol, 2-butoxyethanol, 2-(2-methoxyethoxy)ethanol, 2-(2-ethoxyethoxy)ethanol, 2-(2-propoxyethoxy)ethanol, 2-(2-butoxyethoxy)ethanol (butyl carbitol), di(propylene glycol) butyl ether, methoxytriglycol (tri(ethylene glycol) monomethyl ether), ethoxytriglycol (tri(ethylene glycol) monoethyl ether), butoxytriglycol (tri(ethylene glycol) monobutyl ether), methoxypolyethylene glycol (poly(ethylene glycol) methyl ether), poly(ethylene glycol) butyl ether, poly(ethylene glycol) dimethylether, poly(ethylene glycol-co-propylene glycol), poly(ethylene glycol-co-propylene glycol) monobutyl ether, poly(propylene glycol) monobutyl ether, di(propylene glycol) dimethylether; esters including methyl acetate, ethyl acetate, ethyl lactate, 2-methoxyethyl acetate, 2-ethoxyethyl acetate, 2-butoxyethyl acetate, 2-(2-methoxyethoxy)ethyl acetate, 2-(2-ethoxyethoxy)ethyl acetate, 2-(2-butoxyethoxy)ethyl acetate, glycol diacetate, triethylene glycol diacetate, propylene glycol methyl ether acetate (1-methoxy-2-propanol acetate), propylene glycol ethyl ether acetate, and ketones including acetone, methyl ethyl ketone, 2,4-pentane dione, diacetone alcohol and polyether silanes of the general formula $R^{17}O—(CH_2CH_2O—)_u(CH_2)_v—Si—(OR^{18})_3$ wherein $R^{17}$ is a hydrogen atom, or a linear, branched or cyclic alkyl, aryl, aralkyl or acyl group of from 1 to 6 carbon atoms; $R^{18}$ is a linear, branched or cyclic alkyl group of from 1 to 6 carbon atoms; u is 1 to about 20; and v is 1 to 12, including the exemplary polyether silane sold under the trade name, Silquest* A-1230, by Momentive Performance Materials.

A "stability increasing amount" shall be understood to be an amount of stabilizing agent that provides for the retarding of precipitation or gelation of the condensate in a composition as described herein, compared to an equivalent composition that utilizes less than such an amount of the same stabilizing agent for the periods of stability defined above. It will be understood that a stability-increasing amount will vary widely depending on factors such as the stabilizing agent, silane (a), and other composition components as described herein.

The composition described herein can contain stabilizing agent in an amount of specifically from 1 to 50 weight percent, more specifically of from 2 to 40 weight percent and most specifically of from 3 to 30 weight percent, said weight percents being based upon the total weight of the composition.

Organosilicon Compounds

The conversion or passivation coatings may include organosilicon compounds to provide for additional siloxane functionality (Si—O—Si bonds) that promote adhesion and inhibit corrosion of the metal substrate. The organosilicon compounds include compounds of the general formula (6):

$$R^{20}Si(OR^{19})_3 \qquad (6)$$

wherein each occurrence of $R^{19}$ independently is chosen from an alkyl group of from 1 to 4 carbon atoms; and $R^{20}$ is a monovalent hydrocarbon group having from 1 to 10 carbon atoms or a $—OR^{20}$ group. The organosilicon compounds hydrolyze in the presence of water to provide a source of siloxane bonds.

Representative, non-limiting examples of the organosilicon compounds include tetraethylorthosilicate, tetra-n-propylorthosilicate, tetra-isopropylorthosilicate, methyltrimethoxysilane, methyltriethoxysilane, ethyltriethoxysilane, propyltrimethoxysilane, octyltriethoxysilane and mixtures thereof.

The composition described herein can contain organosilicon compounds in an amount of from 0.01 to 15 weight percent, more specifically of from 0.1 to 10 weight percent and most specifically of from 1 to 5 weight percent, said weight percents being based upon the total weight of the composition.

Organic Surfactants

Organic surfactants may be used to aid in the wetting and leveling of the conversion or passivation coating. The organic surfactants include nonionic, cationic, anionic, amphoteric, zwitterionic, polymeric surfactants, or any mixture thereof. The organic surfactants are typically hydrocarbon based, silicone based or fluorocarbon based. Organic surfactants that have short chain hydrophobes are useful and are described in U.S. Pat. No. 5,558,806, incorporated by reference herein.

Other useful organic surfactants include alkoxylates, especially ethoxylates, containing block copolymers including copolymers of ethylene oxide, propylene oxide, butylene oxide, and mixtures thereof; alkylarylalkoxylates, especially ethoxylates or propoxylates and their derivatives including alkyl phenol ethoxylate; arylarylalkoxylates, especially ethoxylates or propoxylates and their derivatives; amine alkoxylates, especially amine ethoxylates; fatty acid alkoxylates; fatty alcohol alkoxylates; alkyl sulfonates; alkyl benzene and alkyl naphthalene sulfonates; sulfated fatty alcohols, amines or acid amides; acid esters of sodium isethionate; esters of sodium sulfosuccinate; sulfated or sulfonated fatty acid esters; petroleum sulfonates; N-acyl sarcosinates; alkyl polyglycosides; alkyl ethoxylated amines; and mixtures thereof.

Representative, non-limiting examples of organic surfactants include alkyl acetylenic diols sold by Air Products under the trade name SURFYNOL, pyrrolidone-based surfactants sold by ISP under the trade name SURFADONE-LP 100, 2-ethyl hexyl sulfate, isodecyl alcohol ethoxylates sold by Rhodia under the trade name RHODASURF DA 530, oxo-tridecyl alcohol ethoxylates sold by Clariant under the trade name GENAPOL X-020, ethylene diamine alkoxylates sold by BASF under the trade name TETRONICS, ethylene oxide/propylene oxide copolymers sold by BASF under the trade name PLURONICS, diphenyl ether Gemini-type surfactants sold by Dow Chemical Corporation under the trade name DOWFAX, octyl alcohol ethoxylates sold by Henkel Corporation under the trade name DEHYDOL® 04, decyl alcohol ethoxylates sold by Rhone-Poulenc under the trade name EMULPHOGENE® DA-530, trimethylnonanol ethoxylates, sold by Dow Chemical Corporation under the trade name TERGITOL® TMN-6 and alkylpolyglucosides sold by Dow Chemical Corporation under the trade name TRITON® CG-100.

The compositions described herein can contain organic surfactant in an amount of from 0.01 to 5 weight percent, more specifically of from 0.05 to 2 weight percent and most specifically of from 0.1 to 1 weight percent, said weight percents being based upon the total weight of the composition.

Other components, such as colorants, dyes, buffers, organic solvents and the like can also be incorporated into compositions of the present invention.

Preparation of Conversion or Passivation Coatings

The conversion or passivation coatings are prepared by mixing the individual components together (for example, the silane of general formula (1), the silicon-based polyether copolymer of general formula (2), and other optional components). Although the order of addition is not critical, typical procedures involve first adding the silane (a) and the optional organosilicon compound to the water and stirring for 1 to 60 minutes at a temperature of between 5 and 80 degrees Centigrade, followed by addition of the silicon-based polyether copolymer, optional colloidal oxide, optional stabilizing agent and optional organic surfactant. The procedure allows for the silane (a) and organosilicon compound to dissolve into the water and react prior to coming in contact with the other components. When the silane (a) or optional organosilicon compound have poor water solubility, then it is advantageous to simultaneously add the stabilizing agent to the solution. Typically, blade mechanical stirrers are used. High shear mixing, such as a blender, is typically avoided because the high shear may result in gellation of the coating. A stripping, sparging or distilling of the conversion or passivation coating can be used to remove hazardous air pollutants (HAP or HAPS) and volatile organic compounds (VOCs). Additional water or other non-volatile components can be added to the conversion or passivation coating to replenish any water or other non-volatile components removed during the stripping, sparging or distilling step. When lower boiling components are used, the removal of the hazardous air pollution and volatile organic compounds can occur after the mixing of the silane (a) with water, but before the addition of the other components.

Conversion or passivation coatings that are substantially free of hazardous air pollutants (HAP or HAPS) and volatile organic compounds (VOCs) are advantageous. Hazardous air pollutant and volatile organic compounds pose health and safety risks for the workers coming in contact with the conversion or passivation coating, contribute to air pollution, and often require permitting of the manufacturing facility by the local governmental agencies.

Hazardous air pollutants are any compounds used in paints that have been identified as such in the Clean Air Act Amendments of 1990. Hazardous air pollutants can be byproducts formed from the hydrolysis of silane (a), stabilizing agents, solvents, or other components incorporated into the conversion or passivation coatings. The Clean Air Act Amendments of 1990 identified hazardous air pollutants, which include acetamide, acrylamide, acrylic acid, acrylonitrile, allyl chloride, aniline, benzene, 1,3-butadiene, caprolactam, catechol, cumene, 1,2-dichloroethane, dichloroethyl ether, diethanolamine, dimethylamino-azobenzene, dimethylformamide, dimethylphthalate, epichlorohydrin, ethyl acrylate, ethyl benzene, ethylene dibromide, ethylenimine, formaldehyde, hexachlorobenzene, n-hexane, hydroquinone, isophorone, maleic anhydride, methanol, methyl ethyl ketone, methyl isobutyl ketone, methylene chloride, naphthalene, nitrobenzene, 2-nitropropane, pentachlorophenol, phenol, propylene oxide, styrene, 1,1,2,2-tetrachloroethane, toluene, 2,4-toluene diisocyanate, 1,1,1-trichloroethane, trichloroethylene, 2,4,6-trichlorophenol, vinyl acetate, vinyl chloride, xylenes, m-xylene, o-xylene, p-xylene and combinations thereof.

"Substantially free of hazardous air pollutant" refers to a level of hazardous air pollutant of less than about 1 weight percent, more specifically less than about 0.2 weight percent, even more specifically less than about 0.05 weight percent and most specifically less than about 0.01 weight percent, said weight percents being based on the total weight of the composition.

Volatile organic compound is any organic compound, which participates in any atmospheric photochemical reactions and includes all volatile organic compounds except those compounds that the Environmental Protection Agency (EPA) has designated as having negligible photochemical reactivity. Typical volatile organic compounds include methanol, ethanol, n-propanol, 2-propanol, n-butanol, 2-butanol, tert-butanol and combinations thereof.

Low in volatile organic compounds is a level of less than about 10 weight percent, more specifically less than about 5 weight percent, even more specifically less than about 2 weight percent and most specifically less than about 1 weight percent, said weight percents being based on the total weight of the composition, of volatile organic compounds in the conversion or passivation coatings. The amount of volatile organic compound in coatings is calculated according to EPA Method 24 from percent non-volatile, with corrections on exempt solvents and water. The non-volatile content is measured based on ASTM Standards D2369 and D3960. Typically, a sample of material is placed in a dish and placed in a convection oven at 110° C. for 1 hour. The weight remaining in the dish is then determined.

Conversion or passivation coatings can be prepared that are substantially free of hazardous air pollutants and volatile organic compounds by using components that do not contain or generate such pollutants or compounds through chemical reactions when the components are mixed. When components are used that contain hazardous air pollutants or volatile organic compounds, then these compounds can be removed after the components are mixed. The removal of the hazardous air pollutants and volatile organic compounds can be accomplished through sparging of the coating with an inert gas such as the non-limiting example of nitrogen. Sparging can be conducted for a period of from about 2 to about 96 hours, more specifically of from about 4 to about 72 hours, even more specifically of from about 6 to about 48 hours and most specifically of from about 8 to about 24 hours. The removal of HAP can be conducted by reduced pressure and/or distillation. The temperature used to remove the hazardous air pollutants and volatile organic compounds by distillation can be from 5° C. to 95° C., more specifically from 30° C. to 80° C. and most specifically from 50° C. to 70° C. The reduced pressures that can be used are from 0.1 torr to 500 torr, and more specifically from 15 torr to 300 torr.

Illustrative conversion or passivation coating compositions as prepared above are substantially chromate free and preferably substantially phosphate free and comprise, (a) 0.01 to 80 weight percent silane (a);
(b) 0.001 to 10 weight percent of silicon-based polyether copolymer (b);
(c) 1 to 99.99 weight percent water;
(d) optionally, 0.001 to 36 weight percent colloidal oxide;
(e) optionally, 1 to 50 weight percent stabilizing agent;
(f) optionally, 0.01 to 15 weight percent organosilicon compound; and
(g) optionally, 0.01 to 5 weight percent organic surfactant, wherein the weight percents are based upon the total weight of the composition.

Another illustrative conversion or passivation coating composition comprises (a) 0.1 to 60 weight percent silane (a);
(b) 0.01 to 3 weight percent of silicon-based polyether copolymer;
(c) 2 to 99.9 weight percent water;
(d) 0.01 to 30 weight percent colloidal oxide; and
(e) 2 to 40 weight percent stabilizing agent;

wherein, the weight percents are based upon the total weight of the composition.

Method for Treating Metal Surfaces Using Compositions of the Invention

Chrome-free and phosphate-free conversion or passivation coating compositions can be provided on metal surfaces. The metals include, but are not limited to, cold-rolled steel, zinc-coated steel, aluminum, zinc-aluminum coated steels, tin-plated steels, stainless steels, and magnesium, as well as metal alloys including, but not limited to, alloys of the above-listed metals (including alloys of Fe, Al, Zn, Sn, Mg, and the like (illustratively galvalume (a Zn—Al alloy)).

The requisite metal surface may be contacted by the coating composition in spray, immersion, or roller applications. Other methods of applying the above-referenced composition to a surface to be treated include, but are not limited to, brushing, spray coating, immersion, electrostatic coating, roll coating, specifically reverse roll coating, dip coating, flood coating, drawdown coating, and rinse coating. The coating composition is dried, and the metal surface is ready for painting or other coating applications. The treatment of metal surfaces is disclosed in U.S. Patent Application Publication Nos. 2006/0228470 A1 and 200810268146 A1, the contents of both incorporated by reference in their entireties.

The conversion or passivation treatment of the invention may be applied to the surface to be treated to result in a conversion coating weight of greater than about 0.1 milligram per square foot (1 milligram per square meter) of the treated surface, more specifically, with a weight of about 0.5 to 500 milligrams per square foot (5 to 5400 milligrams per square meter) of the treated surface and most specifically with a weight of about 1 to 300 milligrams per square foot (10 to 3200 milligrams per square meter) of the treated surface.

For use in commercial applications, working solutions can be prepared by further diluting the conversion or passivation coating compositions with water. The working solutions comprise from 0.1 to 100 weight percent, specifically from 0.5 to 70 weight percent and more specifically 1 to 50 weight percent concentrations of the conversion or passivation coating compositions, weight percents based upon the total weight of the working solution. Working solutions can be used to contact the desired metal surfaces.

The compositions and/or methods described herein can be used to provide a conversion or passivation coating for metals such as steel and aluminum to improve adhesion to further coatings thereon such as the non-limiting example of paint, and likewise provide improved corrosion protection to said metals. The metals treated by the compositions and/or methods herein can be used in articles of manufacture, including commercial and industrial applications of coated metal sheets such as sheet metal used in construction and the like. For example, the compositions are expected to provide excellent corrosion resistance for metals including but not limited to cold-rolled steel, hot dip galvanized steel, stainless steel, and aluminum for use in such applications as white goods/large appliances, office furniture, decorative blinds, architectural gutters and trim, automotive & machinery parts, and small appliances.

EXAMPLES

The invention will now be described in conjunction with the following examples which are to be regarded as being illustrative of certain embodiments of the invention but should not be viewed to restrict the invention.

Example 1

Preparation of Silicon-Based Polyether Copolymer
$(CH_3)_3Si(CH_2)_2Si(CH_3)_2CH_2CH_2CH_2O(CH_2CH_2O)_{7.5}CH_3$ A 200 mL round-bottom flask was equipped with a magnetic stir bar, reflux condenser w/$N_2$ inlet, thermocouple, addition funnel and heating mantle. Vinyltrimethylsilane (25.7 grams, 0.257 mole) and Karstedt's catalyst (10 ppm) were charged to the flask, and brought to 30° C. under $N_2$. Dichloromethylsilane (24.3 grams, 0.257 mole) was charged to the addition funnel, and added dropwise to the round-bottom flask. An immediate exotherm was noted, and addition continued over 1 hour. After addition, the reaction was maintained at 40° C. for 1 hour, and then analyzed by GC. Greater than 98% conversion to pentamethylchlorodicarbodisilane was found. The product was taken up in toluene (100 grams), charged to a 500-mL round-bottom flask, and the solution was cooled to 0° C.

A solution of sodium dihydro-bis-(2-methoxyethoxy) aluminate (Vitride, 70% in toluene; 39.3 grams of solution, 0.135 mole) was charged to an addition funnel and added dropwise to the solution at a rate to maintain reaction temperature <5° C. (total addition ~2 hours). After complete addition, the reaction was allowed to warm to room temperature, and was stirred an additional 2 hours. A reaction sample was taken, neutralized and analyzed by GC; quantitative conversion to pentamethyldicarbosilane reduction product was found. The reaction mixture was neutralized slowly with 0.5N HCl, then extracted with water (3×100 milliliters) and dried over $Mg_2SO_4$, filtered and bottled as 22% solution in toluene (110 grams).

A 200-mL round-bottom flask was equipped with a magnetic stir bar, reflux condenser w/$N_2$ inlet, thermocouple, addition funnel and heating mantle. Allyl-started, methyl-capped polyethylene oxide, $(CH_2\!=\!CHCH_2O(CH_2CH_2O)_{7.5}CH_3$; 33.7 grams; 0.0810 mole), chloroplatinic acid (10 ppm) and sodium propionate (50 milligrams) were charged to the round-bottom flask, stirred and brought to 80° C. The solution of silane in toluene (45.5 grams of 22% solution; 10.0 grams, 0.0623 mole) was charged to the addition funnel and added dropwise to the flask. A minor exotherm was noted, and addition continued over 45 min. After complete addition, the reaction was maintained at 85° C. for 1 hour. A reaction sample was tested for Si—H content, and 0 cc $H_2$/gram was found remaining. The mixture was stripped (~10 millimeters Hg, 100° C.) for 1.5 hours to remove toluene, allowed to cool to <40° C., treated with Celite and sodium bicarbonate, stirred, pressure filtered, and bottled. The yield was 42.1 grams of clear, pale yellow fluid.

Example 2

Preparation of Silicon-Based Polyether Copolymer of the Structure $(CH_3)_3Si(CH_2)_2Si(CH_3)_2OSi(CH_3)_2CH_2CH_2CH_2O(CH_2CH_2O)_{9.4}CH_3$ A 250-mL round-bottom flask was charged with tetramethyldisiloxane (51.6 grams, 0.4 mole) and Wilkinson's catalyst (($PPh_3)_3RhCl$, 100 ppm), stirred under nitrogen, and brought to 60° C. Trimethylvinylsilane (25.6 grams, 0.25 mole) was charged to an addition funnel, added dropwise at a rate of approximately 1 gram per minute to maintain the reaction temperature less than 70° C. with cooling. The reaction was maintained 1 hour at 65° C., then sampled for gas chromatography (GC); found residual tetramethyldisiloxane and 94:6 $M'M^R$: $M^RM^R$. Resulting material distilled fractionally under vacuum (approx. 30 millimeters Hg) to yield 51.6 grams of ((2-trimethylsilyl)ethyl)tetramethyldisiloxane product, 99.1% GC purity. This product was found to have an content of 96 cc $H_2$/gram by gasiometric titration.

A 250-mL round-bottom flask was equipped with a magnetic stir bar, reflux condenser w/$N_2$ inlet, thermocouple, addition funnel and heating mantle. Two allyl-started poly-ethylene oxide polymers, $CH_2\!=\!CHCH_2(OCH_2CH_2)_{7.5}\!-\!OH$ (MW=389 grams/mole by —OH content; 34.4 grams, 0.0884 mole) and $CH_2\!=\!CHCH_2(OCH_2CH_2)_{11.2}\!-\!OH$ (561 grams/mole) by —OH content; 49.6 grams, 0.0884 mole), isopropanol (15 grams), sodium propionate (0.10 grams), and chloroplatinic acid solution (0.0213 grams) were charged to the flask under $N_2$, stirred, and brought to 60° C. ((2-Trimethylsilyl)ethyl)tetramethyldisiloxane (234.5 grams/mole; 32.0 grams, 0.136 mole) was charged to the addition funnel and added dropwise. An immediate exotherm was noted; the reaction temperature during addition was controlled with an ice bath to <95° C. After complete addition, reaction was maintained at 90° C. for 1 hour. The reaction sample was tested for Si—H content, and we found 5 cc $H_2$/gram remaining. Additional chloroplatinic acid catalyst (5 ppm) was added, and the reaction sample was maintained at 90° C. for 1.5 hours. The reaction was sampled, and it was found complete by Si—H content. The mixture was stripped (~10 millimeter Hg, 70° C.) for 1.5 hours to remove isopropyl alcohol, allowed to cool to <40° C., treated with Celite and sodium bicarbonate, stirred, pressure filtered, and bottled. The yield was 100 grams of clear, pale yellow fluid.

Examples 3-9, Comparative Examples 1-8

Uniformity of Conversion Coating on Different Metal Surfaces

The impact of the silicon-based polyether copolymer (b) and organic surfactant on the performance of a conversion coating or passivation coating was determined for hot-dip galvanized steel (HDG), stainless steel (SS) and cold-rolled steel (CRS) using two different application methods. The formulations shown in Table 1 were prepared by mixing a silane (a), silicon-based polyether copolymer (b), organic surfactant, colloidal cerium oxide and water. Into a 100-mL glass jar were added distilled water, gamma-ureidopropyltrimethoxysilane, colloidal cerium oxide and organic surfactant and the solution was stirred at ambient temperature for 30 minutes.

In the comparative examples, Triton X-100 is an octylphenol ethoxylate surfactant as shown below where p is 5 to 15 and is available from Dow Chemical Corporation. Tergitol NP-12 is a nonyiphenol ethoxylate surfactant as shown below where p is 5 to 15 and is available from Dow Chemical Corporation. Surfynol 485 is ethoxylated 2,4,7,9-tetramethyl-5-decyn-4,7-diol available from Air Products. Silwet*L-8610 is a linear silicone polyether copolymer as shown below where y is 5 to 30 and z is 5 to 15 and is available from Momentive Performance Materials.

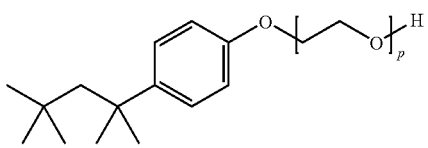

Triton X-100

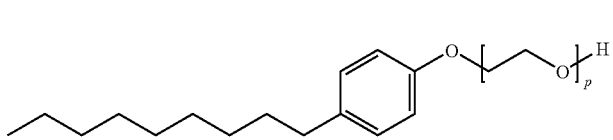

Tergitol NP-12

-continued

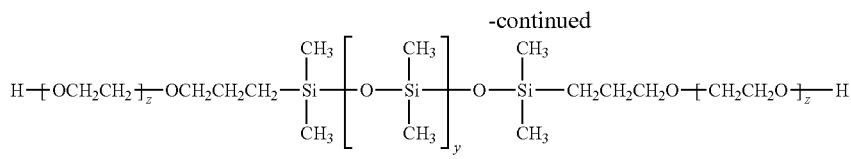

Silwet* L-8610

TABLE 1

| Example | Method | Metal | Silane Conc. | Cerium Oxide | Surfactant | Surfactant Conc. | Location | XRF Response (Si cps) Left | Center | Right |
|---|---|---|---|---|---|---|---|---|---|---|
| Comp. Ex. 1 | Drawdown | HDG | 4% | 1.30% | Triton X-100 | 0.10% | Top | 6320.1 | 6496.2 | 6710.6 |
| | | | | | | | Bottom | 4465.3 | 4165.6 | 4370.8 |
| 3 | | | | | Ex. 1 | 0.10% | Top | 3579.6 | 3429.3 | 3491.3 |
| | | | | | | | Bottom | 3717.1 | 3449.3 | 3365.7 |
| 4 | | | | | Blend[1] | 0.10% | Top | 4841.3 | 5442.7 | 5130.7 |
| | | | | | | | Bottom | 3859.2 | 4273.2 | 4012.7 |
| Comp. Ex. 2 | | | | | None | 0.00% | Top | 6526.5 | 4110.8 | 10523.5 |
| | | | | | | | Bottom | 19879.1 | 17381.5 | 17657.0 |
| Comp. Ex. 3 | Dip | SS | 4% | 1.30% | Tergitol NP-12 | 0.10% | Top | | 4512.0 | |
| | | | | | | | Bottom | | 5770.0 | |
| Comp. Ex. 4 | | | | | Surfynol 485 | 0.10% | Top | | 4411.0 | |
| | | | | | | | Bottom | | 5551.0 | |
| Comp. Ex. 5 | | | | | L-8610 | 0.10% | Top | | 4558.0 | |
| | | | | | | | Bottom | | 5603.0 | |
| 5 | | | | | Ex. 1 | 0.10% | Top | | 4438.0 | |
| | | | | | | | Bottom | | 4367.0 | |
| 6 | | | | | Blend[1] | 0.10% | Top | | 4666.0 | |
| | | | | | | | Bottom | | 5002.0 | |
| Comp. Ex. 6 | Drawdown Squeegee | CRS | 2.0% | 0.67% | Triton X-100 | 0.10% | Top | | 113.88 | |
| | | | | | | | Bottom | | 106.42 | |
| Comp. Ex. 7 | | | 1.0% | 0.33% | | 0.10% | Top | | 60.21 | |
| | | | | | | | Bottom | | 52.46 | |
| Comp. Ex. 8 | | | 0.5% | 0.17% | | 0.10% | Top | | 3.56 | |
| | | | | | | | Bottom | | 5.92 | |
| 7 | | | 2.0% | 0.67% | Ex. 1 | 0.10% | Top | | 129.09 | |
| | | | | | | | Bottom | | 136.87 | |
| 8 | | | 1.0% | 0.33% | | 0.10% | Top | | 62.59 | |
| | | | | | | | Bottom | | 59.23 | |
| 9 | | | 0.5% | 0.17% | | 0.10% | Top | | 17.58 | |
| | | | | | | | Bottom | | 15.06 | |

[1] A blend of 25 weight percent Example 1, 25 weight percent polyoxyethylene/polyoxypropylene copolymer containing 20 percent ethylene oxide and 50 weight percent oxa-tridecylalcohol ethoxylate (5 ethylene oxide units).

Hot-dip galvanized (HDG) steel panels (4 inches by 8 inches by 0.032 inch, ACT Test Panels, LLC) were cleaned by immersion in a standard alkaline cleaning solution for two minutes. Panels were then removed from the bath and rinsed with distilled water. The panels were wiped clean with a lint-free towel, rinsed again with distilled water, and then dried with nitrogen gas. The panels were "water-break-free" subsequent to cleaning. Each panel was individually treated with the silane coating composition using a #3 drawdown bar and an automatic film applicator at 50 millimeters/second. The panels were laid flat and allowed to dry for 10 minutes. The silane layer was then cured on the panel for two minutes in an air-circulating oven set at 150° C. After cooling to room temperature, the panels were cut into three pieces. One piece was 4 inches by 2 inches. The other two were 4 inches by 3 inches. The 4-inch-by-2-inch portion was discarded and the two 4-inch-by-3-inch pieces were analyzed by X-ray fluorescence spectroscopy in three locations each.

Stainless steel panels (SS-36, 3 inches by 6 inches by 0.037 inch, Q-Lab Corporation) were used as received. The panels were individually dipped into a bath of the silane coating composition for two minutes. Each panel was dried using a hot-air gun and the silane layer was cured on the panel for two minutes in an air-circulating oven set at 150° C. After cooling to room temperature, the panels were analyzed by X-ray fluorescence spectroscopy in two locations each.

CRS panels (4 inches by 8 inches by 0.032 inch, ACT Test Panels, LLC) were cleaned by immersion in a standard alkaline cleaning solution for two minutes. Panels were then removed from the bath and rinsed with distilled water. The panels were wiped clean with a lint-free towel, rinsed again with distilled water, and then dried with nitrogen gas. The panels were "water-break-free" subsequent to cleaning. Panels that failed the "water-break-free" test (ASTM F22-02 (2007)) were cleaned a second time using the aforementioned protocol. Each panel was individually treated with the silane coating composition using a #3 drawdown bar and an automatic film applicator at 50 millimeters/second followed by a wipe with a squeegee. The panels were laid flat and allowed to dry for one minute. The silane layer was then cured on the panel for two minutes in an air-circulating oven set at 150° C. After cooling to room temperature, the panels were cut into three pieces (one piece of 4 inches by 2 inches, and two pieces of 4 inches by 3 inches). The 4-inch-by-2-inch portion was discarded and the two 4-inch-by-3-inch pieces were analyzed by X-ray fluorescence spectroscopy.

X-ray fluorescence spectroscopy is a quantitative method for the exclusive detection of silicon on a surface or within a matrix. The Silicon Counts per Second are proportional to the total amount of silicon present on the surface of the substrate. The results are presented in Table 1. For all three substrates (HDG, SS, CRS), inclusion of the silicon-based polyether copolymer provides excellent uniformity of the silane coating composition over the surface of the panel. Further, inclusion of the silicon-based polyether copolymer improves uniformity of the silane coating over hard-to-wet surfaces, such as HDG and SS, relative to the other organic surfactants tested.

Examples 10-17, Comparative Examples 9-17

Evaluation of Corrosion of Various Conversion Coatings

The conversion coatings were prepared using the following mixing procedure: Into a 100-mL glass jar were added distilled water, gamma-ureidopropyltrimethoxysilane, colloidal cerium oxide (1.3 grams of a 20 weight percent aqueous solution) and as indicated, a silicon-based polyether copolymer and organic surfactant. The solution was stirred at ambient temperature for 30 minutes. The amounts of silane, silicon-based polyether copolymer and organic surfactant are shown in Table 2.

The panels were wiped clean with a lint-free towel, rinsed again with distilled water, and then dried with nitrogen gas. The panels were "water-break-free" subsequent to cleaning. Panels that failed the "water-break-free" test (ASTM F22-02 (2007)) were cleaned a second time using the aforementioned protocol.

The silane coating composition was applied using one of two methods: by spray or by drawdown. Sprayed panels were allowed to hang dry, while those treated by drawdown were laid flat. The silane layer was then cured for two minutes in an air-circulating oven set at 150° C.

HDG panels were painted with a polyurethane primer (1 PMY5650) and Duranar Light Sea Wolfe topcoat (5MA8113), both available from PPG Industries. These two coatings were applied and cured per the manufacturer's recommendations.

CRS panels were painted with White Polycron III (AG452W3223) from PPG Industries. The paint was applied and cured per the manufacturer's specifications.

After painting, HDG panels were subjected to Neutral Salt Spray Testing (NSST) according to ASTM B-117 for 500 hours and rated for creep in accordance with ASTM D 1654 (Table 2). CRS panels were tested under the same conditions for 300 hours. Measured in millimeters, creep values are defined as the distance from the scribe line to the edge of the painted layer. The greater the corrosion and paint adhesion

TABLE 2

| Example | Metal | Paint | Silane Conc. | Cerium Oxide Conc. | Surfactant | Application Method | Creep (mm) | NSST Time |
|---|---|---|---|---|---|---|---|---|
| Comp. Ex. 9 | HDG | PPG | 2% | 0.67% | 0.1% Triton X-100 | Spray | 1.75 | 500 hours |
| Comp. Ex. 10 | | (1PMY5650/5MA8113) | 4% | 1.33% | | | 2.10 | |
| Comp. Ex. 11 | | | 6% | 2.00% | | | 1.10 | |
| 10 | | | 4% | 1.33% | 0.1% Ex. 1 | | 1.10 | |
| 11 | | | | | 0.1% Blend[1] | | 1.30 | |
| Comp. Ex. 12 | | | 2% | 0.67% | 0.1% Triton X-100 | Drawdown | 1.85 | |
| Comp. Ex. 13 | | | 4% | 1.33% | | | 1.55 | |
| Comp. Ex. 14 | | | 6% | 2.00% | | | 1.00 | |
| 12 | | | 4% | 1.33% | 0.1% Ex. 1 | | 2.00 | |
| 13 | | | | | 0.1% Blend[1] | | 1.50 | |
| Comp. Ex. 15 | CRS | PPG | 1% | 0.33% | 0.1% Triton X-100 | Spray | 2.75 | 300 hours |
| Comp. Ex. 16 | | (Polycron III) | 2% | 0.67% | | | 2.65 | |
| Comp. Ex. 17 | | | 4% | 1.33% | | | 1.40 | |
| 14 | | | 2% | 0.67% | 0.1% Ex. 1 | Spray | 1.25 | |
| 15 | | | | | | Drawdown | 1.20 | |
| 16 | | | | | 0.1% Blend[1] | Spray | 1.30 | |
| 17 | | | | | | Drawdown | 1.50 | |

[1] A blend of 25 weight percent Example 1, 25 weight percent polyoxyethylene/polyoxypropylene copolymer containing 20 percent ethylene oxide and 50 weight percent oxa-tridecylalcohol ethoxylate (5 ethylene oxide units).
[2] Creep values (in mm) are averages of two samples for each example.

Hot-dip galvanized (HDG) steel panels (4 inches by 8 inches by 0.032 inch, ACT Test Panels, LLC) were cleaned by immersion in a standard alkaline cleaning solution at 60° C. for two minutes. Panels were then removed from the bath and rinsed with distilled water. The panels were wiped clean with a lint-free towel, rinsed again with distilled water, and then dried with nitrogen gas. The panels were "water-break-free" subsequent to cleaning. Panels that failed the "water-break-free" test (ASTM F22-02 (2007)) were cleaned a second time using the aforementioned protocol.

CRS panels (4 inches by 8 inches by 0.032 inch ACT Test Panels, LLC) were cleaned by immersion in a standard alkaline cleaning solution at 60° C. for two minutes. Panels were then removed from the bath and rinsed with distilled water.

loss around the scribe line, the larger the creep value. Therefore, a reduction in creep value translates to an improvement in corrosion protection.

The results are shown in Table 2. The use of the silicon-based polyether copolymer in the silane coating compositions provides a significant improvement in corrosion resistance. For both substrates (HDG and CRS), creep values were reduced up to 50% relative to silane coating compositions using the organic surfactant.

While the invention has been described in detail in connection with specific embodiments thereof, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be limited by the foregoing description.

What is claimed is:

1. A coating composition comprising
(a) at least one silane of the general formula (1):

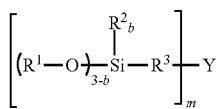

or hydrolyzates or condensates thereof
wherein
   each occurrence of $R^1$ independently is a hydrogen atom, an acyl, a monovalent hydrocarbyl, or an alkoxy-substituted alkyl group of from 1 to 16 carbon atoms;
   each occurrence of $R^2$ independently is alkyl, alkoxy-substituted alkyl, aryl, or aralkyl group of from 1 to 16 carbon atoms;
   each occurrence of $R^3$ independently is a covalent chemical bond or a linear, branched or cyclic divalent organic group of from 1 to 12 carbon atoms;
each occurrence of Y independently is a mono-, di- or polyvalent organofunctional group of valence m;
   each occurrence of subscripts a, b, m and n is independently an integer where a is 0 to 3; b is 0 to 2; and m is 1 to 4;
(b) at least one silicon-based polyether copolymer of the general formula (2):

$$(R^4)(R^5)(R^6)SiR^7Si(R^8)(R^9)[OSi(R^{10})(R^{11})]_xR^{12}(C_2H_4O)_d(C_3H_6O)_e(C_4H_8O)_fR^{13} \quad (2)$$

wherein
each occurrence of $R^4$, $R^5$, $R^6$, $R^8$, $R^9$, $R^{10}$ and $R^{11}$ independently is a monovalent hydrocarbyl group of from 1 to 10 carbon atoms;
each occurrence of $R^7$ independently is a divalent hydrocarbylene group of 1 to 3 carbon atoms;
each occurrence of $R^{12}$ independently is a divalent organic group having the structure:

$$-CH_2-CH(R^{14})(R^{15})_gO-$$

where each occurrence of $R^{14}$ independently is a hydrogen atom or methyl; each occurrence of $R^{15}$ independently is a divalent alkylene radical of 1 to 6 carbon atoms; and the subscript g is 0 or 1;
each occurrence of $R^{13}$ independently is selected from the group consisting of a hydrogen atom, a monovalent hydrocarbon group, and an acyl group of 1 to 6 carbon atoms; and
each occurrence of the subscripts d, e, f and x is an integer where d is 2 to 20, e is 0 to 18, f is 0 to 18 and x is 0 or 1 with the proviso that $2 \leq d+e+f \leq 20$; and
(c) water,
with the proviso that, where the composition comprises condensates of silane (1), it may have a degree of polymerization of between 2 and 50.

2. The coating composition of claim 1 wherein Y is a univalent organofunctional group selected from the group consisting of amino ($-NR^{16}_2$), diamino ($-N(R^{16})R^3NR^{16}_2$), mercapto (—SH), acryloxy ($CH_2=CHCO_2-$), methacryloxy ($CH_2=C(CH_3)CO_2-$), acetoxy ($CH_3CO_2-$), glycidoxy ($-O-CH_2-C_2H_3O$), epoxycyclohexyl ($-C_6H_9O$); epoxy ($-CR^{16}(-O-)CR^{16}_2$), hydroxyl (HO—), dithiocarbonate ($-SC(=O)SR^{16}$), trithiocarbonate ($-SC(=S)SR^{16}$), carbamate ($-NR^{16}(C=O)OR^{16}$), thioester ($-S(C=O)R^{16}$, thiocarbamate ($-NR^{16}(C=O)SR^{16}$), dithiocarbamate ($-NR^{16}(C=S)SR^{16}$), urethane ($-O(C=O)NR^{16}R^{16}$), univalent ureido ($-NR^{16}(C=O)NR^{16}_2$, silyl ($-Si(R^2)_b(OR^1)_{3-a-b}(-O-)_{0.5a}$) and isocyanurato , ($(-N)(NR^{16})(NR^{16})C_3O_3$) where each occurrence of $R^{16}$ is independently selected from the group consisting of hydrogen and straight, branched and cyclic alkyl, alkenyl or aryl of from 1 to 6 carbon atoms.

3. The coating composition of claim 1 wherein Y is a divalent organofunctional group selected from the group consisting of sulfide (—S—), disulfide (—SS—), trisulfide (—SSS—), tetrasulfide (—SSSS—), carbamate $((-))_2N(C=O)OR^{16}$ or $-R^{16}N(C=O)O-$), ureido $((-)_2N(C=O)NR^{16}_2$ or $(-)NR^{16}(C=O)N(-)R^{16})$, and isocyanurato $((-N)_2(NR^{16})C_3O_3)$ where each occurrence of $R^{16}$ is independently selected from the group consisting of hydrogen and straight, branched and cyclic alkyl, alkenyl or aryl of from 1 to 6 carbon atoms.

4. The coating composition of claim 1 wherein Y is a trivalent organofunctional group selected from the group consisting of carbamate $((-)_2N(C=O)O(-))$, ureido $((-)NR^{16}C=O)N(-)_2)$, and isocyanurato $((-N)_3C_3O_3))$ where each occurrence of $R^{16}$ is independently selected from the group consisting of hydrogen and straight, branched and cyclic alkyl, alkenyl, aryl or alkaryl of from 1 to 6 carbon atoms.

5. The coating composition of claim 1 wherein Y is the tetravalent organofunctional group ureido $((-)_2(C=O)N(-)_2)$.

6. The coating composition of claim 1 wherein silane (a) is selected from the group consisting of vinylmethyldiethoxysilane, vinyltrimethoxysilane, vinyldimethylethoxysilane, vinyltriethoxysilane, vinyltripropoxysilane, vinyl-tris(2-methoxyethoxysilane), styrylethyltrimethoxysilane, gamma-acryloxypropyltrimethoxysilane, gamma-(acryloxypropyl) methyldimethoxysilane, gamma-methacryloxypropyl trimethoxysilane, gamma-methacryloxypropyl triethoxysilane, gamma-methacryloxypropyl methyldimethoxysilane, gamma-methacryloxypropyl methyldiethoxysilane, gamma-methacryloxypropyl-tris-(2-methoxyethoxy)silane, beta-(3, 4-epoxycyclohexyl) ethyltrimethoxysilane, beta-(3,4-epoxycyclohexyl) ethyltriethoxysilane, gamma-glycidoxypropyl trimethoxysilane, gamma-glycidoxypropyl triethoxysilane, gamma-glycidoxypropyl methyldiethoxysilane, gamma-glycidoxypropyl methyldimethoxysilane, gamma-mercaptopropyl trimethoxysilane, gamma-mercaptopropyltriethoxysilane, gamma-thiooctanoylpropyltrimethoxysilane, gamma-thiooctanoylpropyl triethoxysilane, bis-(trimethoxysilylpropyl) tetrasulfane, bis-(triethoxysilylpropyl) disulfane, gamma-ureidopropyl trimethoxysilane, gamma-ureidopropyl triethoxysilane, gamma-ureidopropyldimethoxyethoxysilane, gamma-ureidopropylmethoxydiethoxysilane, gamma-ureidopropylmethyldimethoxysilane, gamma-ureidopropylmethyldiethoxysilane, gamma-ureidopropylmethylmethoxyethoxysilane, gamma-carb amatopropyltrim ethoxysilane, gamma-carbamatopropyltriethoxysilane, N,N'-bis-(3-triethoxysilylpropyl)urea, N,N'-bis-(3-trimethoxysilylpropyl)urea, N,N'-bis-(3-diethoxymethylsilylpropyl)urea, N,N'-bis-(3- diisopropoxymethylsilylpropyl)urea, N,N-bis-(3-triethoxysilylpropyl)urea, N,N-bis-(3-trimethoxysilylpropypurea, N,N-bis-(3-diethoxymethylsilylpropyl)urea, N,N-bis-(3-diisopropoxymethylsilylpropyl)urea, N,N,N'-tris-(3-triethoxysilylpropyl)urea, N,N,N'-tris-(3-trimethoxysilylpropyl)urea, N,N,N'-tris-(3-diethoxymethylsilylpropyl)urea, N,N,N'-tris-(3-diisopropoxysilylpropyl)urea, N,N,N,'N'tetrakis-(3-triethoxysilylpropyl)urea, N,N,N,'N'-tetrakis-(3-trimethoxysilylpropyl)urea, N,N,N,'N'-tetrakis-(3-diethoxymethylsilylpropyl)urea, N,N,N,'N'-tetrakis-(3diisopropoxymethylsilylpropyl)urea, N,N',N''-tris-(3-trimethoxysilylpropyl)isocyanurate, and partial or complete hydrolyzates thereof.

7. The coating composition of claim 6 wherein silane (a) is selected from the group consisting of unhydrolyzed, partially hydrolyzed and hydrolyzed gammaureidopropyltrimethoxysilane and gamma-ureidopropyltriethoxysilane.

8. The coating composition of claim 1 wherein the silicon-based polyether copolymer (b) is selected from the group consisting of $(CH_3)_3SiCH_2Si(CH_3)_2CH_2CH_2O(CH_2CH_2O)_2H$, $(CH_3)_3SiCH_2CH_2Si(CH_3)_2CH_2CH_2O(CH_2CH_2O)_3CH_3$, $(CH_3)_3SiCH_2CH_2Si(CH_3)_2CH_2CH_2O(CH_2CH_2O)_7CH_3$, $(CH_3)_3SiCH_2CH_2Si(CH_3)_2$ $CH_2CH_2CH_2O(CH_2CH_2O)_{20}CH_3$, $(CH_3)_3SiCH_2CH_2Si(CH_3)_2CH_2CH(CH_3)CH_2O(CH_2CH_2O)_4CH_3$, $(CH_3)_3$ $SiCH_2CH_2Si(CH_3)_2CH_2CH_2O(CH_2CH_2O)_4(CH_2CH(CH_3)O)_1CH_3$, $(CH_3CH_2)_3SiCH_2CH_2Si(CH_2CH_3)_2CH_2CH_2O(CH_2CH_2O)_4(CH_2CH(CH_3)O)_1CH_3$, $(CH_3CH_2)_3$ $SiCH_2CH_2Si(CH_2CH_3)_2$ $CH_2CH_2O(CH_2CH_2O)_4(CH_2CH(CH_3)O)_1CH_3$, $(CH_3)_2(CH_3CH_2CH_2)$ $SiCH_2CH_2Si(CH_3)_2CH_2CH_2O(CH_2CH_2O)_4(CH_2CH(CH_3)O)_1CH_3$, $(CH_3)_2(C_6H_5CH_2CH_2)SiCH_2CH_2Si(CH_3)_2CH_2CH_2O(CH_2CH_2O)_7(CH_2CH(CH_3)O)_1CH_3$, $(CH_3)_3SiCH_2CH_2Si(CH_3)_2CH_2CH_2CH_2O(CH_2CH_2O)_5(CH_2CH(CH_3)O)_2CH_3$, $(CH_3)_3SiCH_2CH_2Si(CH_3)_2CH_2CH_2CH_2O(CH_2CH_2O)_{15}(CH_2CH(CH_3)O)_5H$, $(CH_3)_3SiCH_2CH_2Si(CH_3)_2$ $CH_2CH_2CH_2O(CH_2CH_2O)_2(CH_2CH(CH_3)O)_{18}CH_3$, $(CH_3)_3$ $iCH_2CH_2Si(CH_3)_2$ $CH_2CH_2CH_2O(CH_2CH_2O)_8(CH_2CH(CH_3)O)_3CH_3$, $(CH_3)_3$ $SiCH_2CH_2Si(CH_3)_2$ $CH_2CH_2CH_2O(CH_2CH_2O)_4(CH_2CH(CH_2CH_3)O)_1CH_3$, $(CH_3)_3$ $SiCH_2CH_2Si(CH_3)_2$ $CH_2CH_2CH_2O(CH_2CH_2O)_{10}(CH_2CH(CH_2CH_3)O)_5CH_3$, $(CH_3)_3SiCH_2CH_2Si(CH_3)_2$ $CH_2CH_2CH_2O(CH_2CH_2O)_{10}(CH_2CH(CH_2CH_3)O)_{10}C(=O)CH_3$, $(CH_3)_3SiCH_2CH_2Si(CH_3)_2CH_2CH_2CH_2O(CH_2CH_2O)_4(CH_2CH(CH_3)O)_1(CH_2CH(CH_2CH_3)O)H$ $(CH_3)_3SiCH_2CH_2Si(CH_3)_2CH_2CH_2O(CH_2CH_2O)_8(CH_2CH(CH_3)O)_5(CH_2CH(CH_2CH_3)O)H$ $(CH_3)_3SiCH_2CH_2Si(CH_3)_2CH_2CH_2CH_2O(CH_2CH_2O)_4(CH_2CH(CH_3)O)_1CH_3$, $(CH_3)_3SiCH_2CH_2CH_2Si(CH_3)_2$ $CH_2CH_2O(CH_2CH_2O)_4$ $CH_3$, $(CH_3)_3SiCH_2CH_2CH_2Si(CH_3)_2CH_2CH_2O(CH_2CH_2O)_5C(=O)CH_3$, $(CH_3)_3$ $SiCH_2CH_2CH_2Si(CH_3)_2$ $CH_2CH_2O(CH_2CH_2O)_4(CH_2CH(CH_3)O)_1CH_3$, $(CH_3CH_2)_3$ $SiCH_2CH_2CH_2Si(CH_2CH_3)_2$ $CH_2CH_2O(CH_2CH_2O)_4(CH_2CH(CH_3)O)_1CH_3$, $(CH_3)_3$ $SiCH_2CH_2CH_2Si(CH_3)_2$ $CH_2CH_2CH_2O(CH_2CH_2O)_4(CH_2CH(CH_3)O)_1CH_3$, $(CH_3)_3$ $SiCH_2Si(CH_3)_2(OSi(CH_3)_2)CH_2CH_2O(CH_2CH_2O)_2H$, $(CH_3)_3SiCH_2CH_2Si(CH_3)_2$ $(OSi(CH_3)_2)CH_2CH_2O(CH_2CH_2O)_3CH_3$, $(CH_3)_3SiCH_2CH_2Si(CH_3)_2(OSi(CH_3)_2)CH_2CH_2CH_2O(CH_2CH_2O)_7CH_3$, $(CH_3)_3$ $SiCH_2CH_2Si(CH_3)_2$ $(OSi(CH_3)_2)CH_2CH_2CH_2O(CH_2CH_2O)_{20}CH_3$, $(CH_3)_3SiCH_2CH_2Si(CH_3)_2$ $(OSi(CH_3)_2)CH_2CH(CH_3)CH_2O(CH_2CH_2O)_4CH_3$, $(CH_3)_3SiCH_2CH_2Si(CH_3)_2(OSi(CH_3)_2)CH_2CH_2CH_2O(CH_2CH_2O)_4(CH_2CH(CH_3)O)_1CH_3$, $(CH_3CH_2)_3SiCH_2CH_2Si(CH_2CH_3)_2(OSi(CH_3)_2)CH_2CH_2O(CH_2CH_2O)_4(CH_2CH(CH_3)O)_1H$, $(CH_3CH_2CH_2)_3$ $SiCH_2CH_2Si(CH_2CH_2CH_3)_2(OSi(CH_3)_2)$ $CH_2CH_2O(CH_2CH_2O)_4—(CH_2CH(CH_3)O)_1CH_3$, $(CH_3)_2(CH_3CH_2CH_2)SiCH_2CH_2Si(CH_3)_2(OSi(CH_3)_2)CH_2CH_2O(CH_2CH_2O)_4—(CH_2CH(CH_3)O)_1CH_3$, $(CH_3)_2(C_6H_5CH_2CH_2)SiCH_2CH_2Si(CH_3)_2(OSi(CH_3)_2)CH_2CH_2O—(CH_2CH_2O)_7(CH_2CH(CH_3)O)_1CH_3$, $(CH_3)_3SiCH_2CH_2Si(CH_3)_2(OSi(CH_3)_2)CH_2CH_2CH_2O(CH_2CH_2O)_5(CH_2CH(CH_3)O)_2CH_3$, $(CH_3)_3SiCH_2CH_2Si(CH_3)_2(OSi(CH_3)_2)CH_2CH_2CH_2O(CH_2CH_2O)_{15}(CH_2CH(CH_3)O)_5H$, $(CH_3)_3SiCH_2CH_2Si(CH_3)_2(OSi(CH_3)_2)CH_2CH_2CH_2O(CH_2CH_2O)_2(CH_2CH(CH_3)O)_{18}CH_3$, $(CH_3)_3$ $SiCH_2CH_2Si(CH_3)_2(OSi(CH_3)_2)CH_2CH_2CH_2O(CH_2CH_2O)_8(CH_2CH(CH_3)O)_3CH_3$, $(CH_3)_3SiCH_2CH_2Si(CH_3)_2(OSi(CH_3)_2)CH_2CH_2CH_2O(CH_2CH_2O)_4—(CH_2CH(CH_2CH_3)O)_1CH_3$, $(CH_3)_3SiCH_2CH_2Si(CH_3)_2(OSi(CH_3)_2)CH_2CH_2CH_2O(CH_2CH_2O)_{10}—(CH_2CH(CH_2CH_3)O)_5CH_3$, $(CH_3)_3SiCH_2CH_2Si(CH_3)_2$ $(OSi(CH_3)_2)CH_2CH_2CH_2O(CH_2CH_2O)_{10}—(CH_2CH(CH_2CH_3)O)_{10}C(=O)CH_3$, $(CH_3)_3SiCH_2CH_2Si(CH_3)_2(OSi(CH_3)_2)CH_2CH_2O(CH_2CH_2O)_4(CH_2CH(CH_3)O)_1—(CH_2CH(CH_2CH_3)O)H$, $(CH_3)_3SiCH_2CH_2Si(CH_3)_2(OSi(CH_3)_2)CH_2CH_2O(CH_2CH_2O)_8—(CH_2CH(CH_3)O)_5(CH_2CH(CH_2CH_3)O)H$, $(CH_3)_3SiCH_2CH_2Si(CH_3)_2(OSi(CH_3)_2)CH_2CH_2CH_2O(CH_2CH_2O)_4(CH_2CH(CH_3)O)_1CH_3$, $(CH_3)_3SiCH_2CH_2CH_2Si(CH_3)_2(OSi(CH_3)_2)CH_2CH_2O(CH_2CH_2O)_4CH_3$, $(CH_3)_3SiCH_2CH_2CH_2Si(CH_3)_2(OSi(CH_3)_2)CH_2CH_2O(CH_2CH_2O)_5C(=O)CH_3$, $(CH_3)_3SiCH_2CH_2CH_2Si(CH_3)_2(OSi(CH_3)_2)CH_2CH_2O(CH_2CH_2O)_4(CH_2CH(CH_3)O)_1CH_3$, $(CH_3CH_2)_3SiCH_2CH_2CH_2Si(CH_2CH_3)_2(OSi(CH_3)_2)CH_2CH_2O(CH_2CH_2O)_4—(CH_2CH(CH_3)O)_1CH_3$, $(CH_3)_3SiCH_2CH_2CH_2Si(CH_3)_2(OSi(CH_3)_2)CH_2CH_2CH_2O(CH_2CH_2O)_4—(CH_2CH(CH_3)O)_1CH_3$, and mixtures thereof.

9. The coating composition of claim 7 wherein the silicon-based polyether copolymer (b) is selected from the group consisting of $(CH_3)_3SiCH_2Si(CH_3)_2CH_2CH_2(CH_2CH_2O)_2H$, $(CH_3)_3SiCH_2CH_2Si(CH_3)_2CH_2CH_2O(CH_2CH_2O)_3CH_3$, $(CH_3)_3SiCH_2CH_2Si(CH_3)_2CH_2CH_2CH_2O(CH_2CH_2O)_7CH_3$, $(CH_3)_3SiCH_2CH_2Si(CH_3)_2$ $CH_2CH_2CH_2O(CH_2CH_2O)_{20}CH_3$, $(CH_3)_3SiCH_2CH_2Si(CH_3)_2CH_2CH(CH_3)CH_2O(CH_2CH_2O)_4CH_3$, $(CH_3)_3$ $SiCH_2CH_2Si(CH_3)_2CH_2CH_2O(CH_2CH_2O)_4(CH_2CH(CH_3)O)_1CH_3$, $(CH_3CH_2)_3SiCH_2CH_2Si(CH_2CH_3)_2CH_2CH_2O(CH_2CH_2O)_4(CH_2CH(CH_3)O)_1CH_3$, $(CH_3CH_2CH_2)_3SiCH_2CH_2Si(CH_2CH_2CH_3)_2$ $CH_2CH_2O(CH_2CH_2O)_4(CH_2CH(CH_3)O)_1CH_3$, $(CH_3)_2(CH_3CH_2CH_2)SiCH_2CH_2Si(CH_3)_2CH_2CH_2O(CH_2CH_2O)_4(CH_2CH(CH_3)O)_1CH_3$, $(CH_3)_2(C_6H_5CH_2CH_2)SiCH_2CH_2Si(CH_3)_2CH_2CH_2O(CH_2CH_2O)_7$ $(CH_2CH(CH_3)O)_1CH_3$, $(CH_3)_3SiCH_2CH_2Si(CH_3)_2$ $CH_2CH_2CH_2O$ $(CH_2CH_2O)_5(CH_2CH(CH_3)O)_2CH_3$, $(CH_3)_3$ $SiCH_2CH_2Si(CH_3)_2CH_2CH_2CH_2O(CH_2CH_2O)_{15}(CH_2CH(CH_3)O)_5H$, $(CH_3)_3SiCH_2CH_2Si(CH_3)_2CH_2CH_2CH_2O(CH_2CH_2O)_2(CH_2CH(CH_3)O)_{18}CH_3$, $(CH_3)_3$ $SiCH_2CH_2Si(CH_3)_2$ $CH_2CH_2CH_2O$ $(CH_2CH_2O)_8(CH_2CH(CH_3)O)_3CH_3$, $(CH_3)_3$ $SiCH_2CH_2Si(CH_3)_2$ $CH_2CH_2CH_2O(CH_2CH_2O)_4(CH_2CH(CH_2CH_3)O)_1CH_3$, $(CH_3)_3$ $SiCH_2CH_2Si(CH_3)_2$ $CH_2CH_2CH_2O(CH_2CH_{20})_{10}(CH_2CH(CH_2CH_3)O)_5CH_3$, $(CH_3)_3SiCH_2$ $Si(CH_3)_2$ $CH_2CH_2CH_2O$ $(CH_2CH_2O)_{10}(CH_2CH(CH_2CH_3)O)_{10}C(=O)CH_3$, $(CH_3)_3SiCH_2CH_2Si(CH_3)_2CH_2CH_2O(CH_2CH_2O)_4(CH_2CH(CH_3)O)_1(CH_2CH(CH_2CH_3)O)H$ $(CH_3)_3SiC$ $H_2CH_2Si(CH_3)_2CH_2CH_2O(CH_2CH_2O)_8(CH_2CH(CH_3)O)_5(CH_2CH(CH_2CH_3)O)H$ $(CH_3)_3SiCH_2CH_2Si(CH_3)_2CH_2CH_2CH_2O(CH_2CH_2O)_4(CH_2CH(CH_3)O)_1CH_3$, $(CH_3)_3SiCH_2CH_2Si(CH_3)_2$ $CH_2CH_2O(CH_2CH_2O)_4CH_3$ $(CH_3)_3SiCH_2CH_2CH_2Si(CH_3)_2CH_2CH_2O(CH_2CH_2O)_5$ $C(=O)$ $CH_3$, $(CH_3)_3$ SiCH$_2$CH$_2$CH$_2$Si(CH$_3$)$_2$CH$_2$CH$_2$O(CH$_2$CH$_2$O)$_4$(CH$_2$CH(CH$_3$)O)$_1$CH$_3$, (CH$_3$CH$_2$)$_3$SiCH$_2$CH$_2$CH$_2$Si(CH$_2$CH$_3$)$_2$CH$_2$CH$_2$O(CH$_2$CH$_2$O)$_4$ (CH$_2$CH(CH$_3$)O)$_1$CH$_3$, (CH$_3$)$_3$SiCH$_2$CH$_2$CH$_2$Si(CH$_3$)$_2$CH$_2$CH$_2$O(CH$_2$CH$_2$O)$_4$(CH$_2$CH(CH$_3$)O)$_1$CH$_3$, (CH$_3$)$_3$SiCH$_2$CH$_2$Si(CH$_3$)$_2$(OSi(CH$_3$)$_2$)CH$_2$CH$_2$O(CH$_2$CH$_2$O)$_2$H, (CH$_3$)$_3$SiCH$_2$CH$_2$Si(CH$_3$)$_2$(OSi(CH$_3$)$_2$)CH$_2$CH$_2$O(CH$_2$CH$_2$O)$_3$CH$_3$, (CH$_3$)$_3$SiCH$_2$CH$_2$Si(CH$_3$)$_2$(OSi(CH$_3$)$_2$)CH$_2$CH$_2$O(CH$_2$CH$_2$O)$_7$CH$_3$, (CH$_3$)$_3$ SiCH$_2$CH$_2$Si(CH$_3$)$_2$(OSi(CH$_3$)$_2$)CH$_2$CH$_2$O(CH$_2$CH$_2$O)$_{20}$CH$_3$, (CH$_3$)$_3$SiCH$_2$CH$_2$Si(CH$_3$)$_2$(OSi(CH$_3$)$_2$)CH$_2$CH(CH$_3$)CH$_2$O(CH$_2$CH$_2$O)$_4$CH$_3$, (CH$_3$)$_3$SiCH$_2$CH$_2$Si(CH$_3$)$_2$(OSi(CH$_3$)$_2$)CH$_2$CH$_2$O(CH$_2$CH$_2$O)$_4$(CH$_2$CH(CH$_3$)O)$_1$CH$_3$, (CH$_3$CH$_2$)$_3$SiCH$_2$CH$_2$Si(CH$_2$CH$_3$)$_2$(OSi(CH$_3$)$_2$)CH$_2$CH$_2$O(CH$_2$CH$_2$O)$_4$(CH$_2$CH(CH$_3$)O)$_1$H, (CH$_3$CH$_2$CH$_2$)$_3$SiCH$_2$CH$_2$Si(CH$_2$CH$_2$CH$_3$)$_2$(OSi(CH$_3$)$_2$)CH$_2$CH$_2$O(CH$_2$CH$_2$O)$_4$—(CH$_2$CH(CH$_3$)O)$_1$CH$_3$, (CH$_3$)$_2$(CH$_3$CH$_2$CH$_2$)SiCH$_2$CH$_2$Si(CH$_3$)$_2$(OSi(CH$_3$)$_2$)CH$_2$CH$_2$O(CH$_2$CH$_2$O)$_4$—(CH$_2$CH(CH$_3$)O)$_1$CH$_3$, (CH$_3$)$_2$(C$_6$H$_5$CH$_2$CH$_2$)SiCH$_2$CH$_2$Si(CH$_3$)$_2$(OSi(CH$_3$)$_2$)CH$_2$CH$_2$O—(CH$_2$CH$_2$O)$_7$(CH$_2$CH(CH$_3$)O)$_1$CH$_3$, (CH$_3$)$_3$SiCH$_2$CH$_2$Si(CH$_3$)$_2$(OSi(CH$_3$)$_2$)CH$_2$CH$_2$CH$_2$O(CH$_2$CH$_2$O)$_5$(CH$_2$CH(CH$_3$)O)$_2$CH$_3$, (CH$_3$)$_3$SiCH$_2$CH$_2$Si(CH$_3$)$_2$(OSi(CH$_3$)$_2$)CH$_2$CH$_2$CH$_2$O(CH$_2$CH$_2$O)$_{15}$(CH$_2$CH(CH$_3$)O)$_5$H, (CH$_3$)$_3$SiCH$_2$CH$_2$Si(CH$_3$)$_2$(OSi(CH$_3$)$_2$)CH$_2$CH$_2$CH$_2$O(CH$_2$CH$_2$O)$_2$(CH$_2$CH(CH$_3$)O)$_{18}$CH$_3$, (CH$_3$)$_3$ SiCH$_2$CH$_2$Si(CH$_3$)$_2$(OSi(CH$_3$)$_2$)CH$_2$CH$_2$CH$_2$O(CH$_2$CH$_2$O)$_8$ (CH$_2$CH(CH$_3$)O)$_3$CH$_3$, (CH$_3$)$_3$SiCH$_2$CH$_2$Si(CH$_3$)$_2$ (OSi(CH$_3$)$_2$)CH$_2$CH$_2$CH$_2$O(CH$_2$CH$_2$O)$_4$—(CH$_2$CH(CH$_2$CH$_3$)O)$_1$CH$_3$, (CH$_3$)$_3$SiCH$_2$CH$_2$Si(CH$_3$)$_2$ (OSi(CH$_3$)$_2$)CH$_2$CH$_2$CH$_2$O(CH$_2$CH$_2$O)$_{10}$—(CH$_2$CH(CH$_2$CH$_3$)O)$_5$CH$_3$, (CH$_3$)$_3$SiCH$_2$CH$_2$Si(CH$_3$)$_2$ (OSi(CH$_3$)$_2$)CH$_2$CH$_2$CH$_2$O(CH$_2$CH$_2$O)$_{10}$—(CH$_2$CH(CH$_2$CH$_3$)O)$_{16}$C(=O)CH$_3$, (CH$_3$)$_3$ SiCH$_2$CH$_2$Si(CH$_3$)$_2$(OSi(CH$_3$)$_2$)CH$_2$ CH$_2$O (CH$_2$CH$_2$O)$_4$(CH$_2$CH(CH$_3$)O)$_1$—(CH$_2$ CH(CH$_2$CH$_3$)O)H, (CH$_3$)$_3$ SiCH$_2$CH$_2$Si(CH$_3$)$_2$(OSi(CH$_3$)$_2$)CH$_2$CH$_2$O (CH$_2$CH$_2$O)$_8$—(CH$_2$ CH(CH$_3$)O)$_5$(CH$_2$CH(CH$_2$CH$_3$)O)H, (CH$_3$)$_3$SiCH$_2$CH$_2$Si(CH$_3$)$_2$(OSi(CH$_3$)$_2$)CH$_2$CH$_2$CH$_2$O(CH$_2$CH$_2$O)$_4$(CH$_2$CH(CH$_3$)O)$_1$CH$_3$, (CH$_3$)$_3$SiCH$_2$CH$_2$CH$_2$Si(CH$_3$)$_2$(OSi(CH$_3$)$_2$)CH$_2$CH$_2$O(CH$_2$CH$_2$O)$_4$CH$_3$, (CH$_3$)$_3$SiCH$_2$CH$_2$CH$_2$Si(CH$_3$)$_2$(OSi(CH$_3$)$_2$)CH$_2$CH$_2$O(CH$_2$CH$_2$O)$_5$C(=O)CH$_3$, (CH$_3$)$_3$SiCH$_2$CH$_2$CH$_2$Si(CH$_3$)$_2$(OSi(CH$_3$)$_2$)CH$_2$CH$_2$O(CH$_2$CH$_2$O)$_4$(CH$_2$CH(CH$_3$)O)$_1$CH$_3$, (CH$_3$CH$_2$)$_3$SiCH$_2$CH$_2$CH$_2$Si(CH$_2$CH$_3$)$_2$(OSi(CH$_3$)$_2$)CH$_2$CH$_2$O(CH$_2$CH$_2$O)$_4$—(CH$_2$CH(CH$_3$)O)$_1$CH$_3$, (CH$_3$)$_3$SiCH$_2$CH$_2$Si(CH$_3$)$_2$(OSi(CH$_3$)$_2$)CH$_2$CH$_2$CH$_2$O(CH$_2$CH$_2$O)$_4$—(CH$_2$CH(CH$_3$)O)$_1$CH$_3$, and mixtures thereof.

10. The coating composition of claim 1 further comprising a colloidal oxide selected from the group consisting of silica (SiO$_2$), cerium oxide, cerium oxide nitrate, cerium oxide acetate, zinc oxide (ZnO), zirconium dioxide (ZrO$_2$), titanium dioxide (TiO$_2$), aluminum oxide (Al$_2$O$_3$) and combinations thereof.

11. The coating composition of claim 9 further comprising a colloidal oxide selected from the group consisting of silica (SiO$_2$), cerium oxide, cerium oxide nitrate, cerium oxide acetate, zinc oxide (ZnO), zirconium dioxide (ZrO$_2$), titanium dioxide (TiO$_2$), aluminum oxide (Al$_2$O$_3$) and combinations thereof.

12. The coating composition of claim 1 further comprising a stabilizing agent selected from the group consisting of ethanol, 1-propanol, 2-propanol, 2-methyl-1-propanol, 2-methyl-2-propanol, 1-butanol, 2-butanol, 2-methyl-1-butanol, 2-methyl-2-butanol, 2,2-dimethyl-1-propanol, 1-pentanol, 2-pentanol, 4-methyl-2-pentanol; glycols including propylene glycol, 1,3-butanediol, 1,4-butane diol, 2-methyl-1,3-propanediol, 2-methyl-2,4-pentanediol, diethylene glycol, triethylene glycol, tetraethylene glycol, poly(ethylene glycol), dipropylene glycol, tripropylene glycol, poly(propylene glycol), 1,5-pentanediol, esterdiol 204, 2,2,4-trimethylpentanediol, 2-ethyl-1,3-hexanediol, glycerol, glycerol ethoxylate, glycerol ethoxylate- co-propoxylate triol, glycerol propoxylate, pentaerythritol, 1-methoxy-2-propanol, 1-ethoxy-2-propanol, 1-propoxy-2-propanol, 1-butoxy-2-propanol, 2-methoxyethanol, 2-ethoxyethanol, 2-propoxyethanol, 2-butoxyethanol, 2-(2-methoxyethoxy)ethanol, 2-(2-ethoxyethoxy)ethanol, 2-(2-propoxyethoxy)ethanol, 2-(2-butoxyethoxy)ethanol, di(propylene glycol) butyl ether, methoxytriglycol, ethoxytriglycol, butoxytriglycol methoxypolyethylene glycol, poly(ethylene glycol) butyl ether, poly(ethylene glycol) dimethylether, poly(ethylene glycol-co-propylene glycol), poly(ethylene glycol-co-propylene glycol) monobutyl ether, poly(propylene glycol) monobutyl ether, di(propylene glycol) dimethylether methyl acetate, ethyl acetate, ethyl lactate, 2-methoxyethyl acetate, 2-ethoxyethyl acetate, 2-butoxyethyl acetate, 2-(2-methoxyethoxy)ethyl acetate, 2-(2-ethoxyethoxy)ethyl acetate, 2-(2-butoxyethoxy)ethyl acetate, glycol diacetate, triethylene glycol diacetate, propylene glycol methyl ether acetate, propylene glycol ethyl ether acetate, acetone, methyl ethyl ketone, 2,4-pentane dione, diacetone alcohol and polyether silanes of the general formula R$^{17}$O—(CH$_2$CH$_2$O—)$_u$(CH$_2$)$_v$—Si—(OR$^{18}$)$_3$ wherein R$^{17}$ is a hydrogen atom, or a linear, branched or cyclic alkyl, aryl, aralkyl or acyl group of from 1 to 6 carbon atoms; R$^{18}$ is a linear, branched or cyclic alkyl group of from 1 to 6 carbon atoms; u is 1 to about 20; and v is 1 to 12.

13. The coating composition of claim 2 further comprising at least one additive selected from the group consisting of colloidal oxides, stabilizing agents, organosilicon compounds, organic surfactants, buffers, colorants, dyes, and organic solvents.

14. The coating composition of claim 13 wherein said organic surfactants are selected from the group consisting of alkyl acetylenic diols, pyrrolidone-based surfactants, 2-ethyl hexyl sulfate, isodecyl alcohol ethoxylates, oxo-tridecyl alcohol ethoxylates, ethylene diamine alkoxylates, ethylene oxide/propylene oxide copolymers, and diphenyl ether Gemini-type surfactants.

15. The coating composition of claim 14 wherein said organic surfactant is present in an amount of from 0.01 to 5 weight percent based on total weight of said coating composition.

16. The coating composition of claim 15 where said organic surfactant is present in an amount of from 0.05 to about 2 weight percent based on total weight percent of said coating composition.

17. The coating composition of claim 1 wherein said coating composition is substantially free of phosphate and substantially free of chromium.

18. The coating composition of claim 1 wherein said coating composition contains less than 2 weight percent volatile organic compound, said weight percent being based on the total weight of the composition.

19. The coating composition of claim 1 wherein said coating composition contains less than 1 weight percent of a hazardous air pollutant, said weight percent being based on the total weight of the composition.

20. The coating composition of claim 1 wherein the composition comprises
(a) 0.01 to 80 weight percent silane (a);
(b) 0.001 to 10 weight percent of silicon-based polyether copolymer (b); and
(c) 1 to 99.99 weight percent water,
said weight percents being based upon the total weight of the composition.

21. The coating composition of claim 20 wherein the coating composition comprises
(a) 1 to 40 weight percent silane (a);
(b) 0.1 to 0.5 weight percent of silicon-based polyether copolymer (b); and
(c) 1 to 99.99 weight percent water,
said weight percents being based upon the total weight of the composition.

22. The coating composition of claim 1 wherein the coating composition comprises
(a) 0.1 to 60 weight percent silane (a);
(b) 0.01 to 3 weight percent of silicon-based polyether copolymer (b);
(c) 2 to 99.9 weight percent water;
(d) 0.01 to 30 weight percent colloidal oxide; and
(e) 2 to 40 weight percent stabilizer agent;
wherein the weight percents are based upon the total weight of the composition.

23. A method of treating a metal surface to form a coating thereon, comprising contacting the metal surface with a coating composition comprising
(a) at least one silane of the general formula (1):

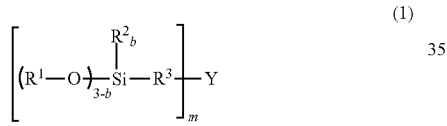

or hydrolyzates or condensates thereof
wherein
each occurrence of $R^1$ independently is a hydrogen atom, an acyl, a monovalent hydrocarbyl, or an alkoxy-substituted alkyl group of from 1 to 16 carbon atoms;
each occurrence of $R^2$ independently is alkyl, alkoxy-substituted alkyl, aryl, or aralkyl group of from 1 to 16 carbon atoms;
each occurrence of $R^3$ independently is a covalent chemical bond or a linear, branched or cyclic divalent organic group of from 1 to 12 carbon atoms;
each occurrence of Y independently is a mono-, di- or polyvalent organofunctional group of valence m;
each occurrence of subscripts a, b, m and n is independently an integer where a is 0 to 3; b is 0 to 2; and m is 1 to 4;
(b) at least one silicon-based polyether copolymer of the general formula (2):

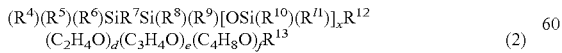

wherein
each occurrence of $R^4$, $R^5$, $R^6$, $R^8$, $R^9$, $R^{10}$ and $R^{11}$ independently is a monovalent hydrocarbyl group of from 1 to 10 carbon atoms;
each occurrence of $R^7$ independently is a divalent hydrocarbylene group of 1 to 3 carbon atoms;
each occurrence of $R^{12}$ independently is a divalent organic group having the structure:

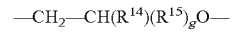

where each occurrence of $R^{14}$ independently is a hydrogen atom or methyl; each occurrence of $R^{15}$ independently is a divalent alkylene radical of 1 to 6 carbon atoms; and the subscript g is 0 or 1;
each occurrence of $R^{13}$ independently is selected from the group consisting of a hydrogen atom, a monovalent hydrocarbon group, and an acyl group of 1 to 6 carbon atoms; and
each occurrence of the subscripts d, e, f and x is an integer where d is 2 to 20, e is 0 to 18, f is 0 to 18 and x is 0 or 1 with the proviso that $2 \leq d+e+f \leq 20$; and
(c) water,
with the proviso that, where the composition comprises condensates of silane (1), it may have a degree of polymerization of between 2 and 50.

24. The method of claim 23, wherein said contacting of said metal surface comprises brushing, spray coating, immersion, electrostatic coating, roll coating, reverse roll coating, dip coating, flood coating, drawdown coating, or rinse coating.

25. The method of claim 23, wherein said metal is selected from the group consisting of cold-rolled steel, zinc-coated steel, aluminum, zinc-aluminum coated steels, tin-plated steels, stainless steels, and magnesium.

26. A metal having a coating composition applied thereto, wherein said coating composition comprises
(a) at least one silane of the general formula (1):

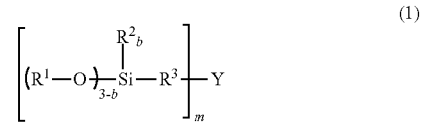

or hydrolyzates or condensates thereof
wherein
each occurrence of $R^1$ independently is a hydrogen atom, an acyl, a monovalent hydrocarbyl, or an alkoxy-substituted alkyl group of from 1 to 16 carbon atoms;
each occurrence of $R^2$ independently is alkyl, alkoxy-substituted alkyl, aryl, or aralkyl group of from 1 to 16 carbon atoms;
each occurrence of $R^3$ independently is a covalent chemical bond or a linear, branched or cyclic divalent organic group of from 1 to 12 carbon atoms;
each occurrence of Y independently is a mono-, di- or polyvalent organofunctional group of valence m;
each occurrence of subscripts a, b, m and n is independently an integer where a is 0 to 3; b is 0 to 2; and m is 1 to 4;
(b) at least one silicon-based polyether copolymer of the general formula (2):

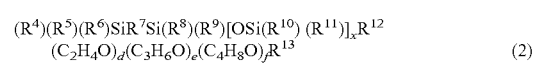

wherein
each occurrence of $R^4$, $R^5$, $R^6$, $R^8$, $R^9$, $R^{10}$ and $R^{11}$ independently is a monovalent hydrocarbyl group of from 1 to 10 carbon atoms;
each occurrence of $R^7$ independently is a divalent hydrocarbylene group of 1 to 3 carbon atoms;

each occurrence of $R^{12}$ independently is a divalent organic group having the structure:

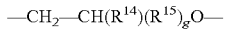
—$CH_2$—$CH(R^{14})(R^{15})_gO$— where each occurrence of $R^{14}$ independently is a hydrogen atom or methyl; each occurrence of $R^{15}$ independently is a divalent alkylene radical of 1 to 6 carbon atoms; and the subscript g is 0 or 1;

each occurrence of $R^{13}$ independently is selected from the group consisting of a hydrogen atom, a monovalent hydrocarbon group, and an acyl group of 1 to 6 carbon atoms; and each occurrence of the subscripts d, e, f and x is an integer where d is 2 to 20, e is 0 to 18, f is 0 to 18 and x is 0 or 1 with the proviso that $2 \leq d+e+f \leq 20$; and (c) water, with the proviso that, where the composition comprises condensates of silane (1), it may have a degree of polymerization of between 2 and 50.

27. The metal of claim 26 wherein said metal is selected from the group consisting of cold-rolled steel, zinc-coated steel, aluminum, zinc-aluminum coated steels, tin-plated steels, stainless steels, magnesium, and metal alloys.

28. The metal of claim 26 wherein said silane (a) of said coating composition is selected from the group consisting of unhydrolyzed, partially hydrolyzed and hydrolyzed gamma-ureidopropyltrimethoxysilane and gamma-ureidopropyltriethoxysilane.

29. The metal of claim 26 wherein said silicon-based polyether copolymer (b) of said coating composition is selected from the group consisting of $(CH_3)_3SiCH_2Si(CH_3)_2CH_2CH_2O(CH_2CH_2O)_2H$, $(CH_3)_3SiCH_2CH_2Si(CH_3)_2CH_2CH_2O(CH_2CH_2O)_3CH_3$, $(CH_3)_3SiCH_2CH_2Si(CH_3)_2CH_2CH_2CH_2O(CH_2CH_2O)_7CH_3$, $(CH_3)_3SiCH_2CH_2Si(CH_3)_2CH_2CH_2CH_2O(CH_2CH_2O)_{20}CH_3$, $(CH_3)_3SiCH_2CH_2Si(CH_3)_2CH_2CH(CH_3)CH_2O(CH_2CH_2O)_4CH_3$, $(CH_3)_3SiCH_2CH_2Si(CH_3)_2CH_2CH_2O(CH_2CH_2O)_4(CH_2CH(CH_3)O)_1CH_3$, $(CH_3CH_2)_3SiCH_2CH_2Si(CH_2CH_3)_2CH_2CH_2O(CH_2CH_2O)_4(CH_2CH(CH_3)O)_1CH_3$, $(CH_3CH_2)_3SiCH_2CH_2Si(CH_2CH_2CH_3)_2CH_2CH_2O(CH_2CH_2O)_4.(CH_2CH(CH_3)O)_1CH_3$, $(CH_3)_2(CH_3CH_2CH_2)SiCH_2CH_2Si(CH_3)_2CH_2CH_2O(CH_2CH_2O)_4(CH_2CH(CH_3)O)_1CH_3$, $(CH_3)_2(C_6H_5CH_2CH_2)SiCH_2CH_2Si(CH_3)_2CH_2CH_2O(CH_2CH_2O)_7(CH_2CH(CH_3)O)_1CH_3$, $(CH_3)_3SiCH_2CH_2Si(CH_3)_2CH_2CH_2CH_2O(CH_2CH_2O)_5(CH_2CH(CH_3)O)_2CH_3$, $(CH_3)_3SiCH_2CH_2Si(CH_3)_2CH_2CH_2CH_2O(CH_2CH_2O)_{15}(CH_2CH(CH_3)O)_5H$, $(CH_3)_3SiCH_2CH_2Si(CH_3)_2CH_2CH_2CH_2CH_2O(CH_2CH_2O)_2(CH_2CH(CH_3)O)_{18}CH_3$, $(CH_3)_3SiCH_2CH_2Si(CH_3)_2CH_2CH_2CH_2O(CH_2CH_2O)_8(CH_2CH(CH_3)O)_3CH_3$, $(CH_3)_3SiCH_2CH_2Si(CH_3)_2CH_2CH_2CH_2O(CH_2CH_2O)_4(CH_2CH(CH_3)O)_1CH_3$, $(CH_3)_3SiCH_2CH_2Si(CH_3)_2CH_2CH_2CH_2O(CH_2CH_2O)_{10}(CH_2CH(CH_2CH_3)O)_5CH_3$, $(CH_3)_3SiCH_2CH_2Si(CH_3)_2CH_2CH_2CH_2O(CH_2CH_2O)_{10}(CH_2CH(CH_2CH_3)O)_{10}C(=O)CH_3$, $(CH_3)_3SiCH_2CH_2Si(CH_3)_2CH_2CH_2O(CH_2CH_2O)_4(CH_2CH(CH_3)O)_1(CH_2CH(CH_2CH_3)O)H$, $(CH_3)_3SiCH_2CH_2Si(CH_3)_2CH_2CH_2O(CH_2CH_2O)_8(CH_2CH(CH_3)O)_5(CH_2CH(CH_2CH_3)O)H$, $(CH_3)_3SiCH_2CH_2Si(CH_3)_2CH_2CH_2CH_2O(CH_2CH_2O)_4(CH_2CH(CH_3)O)_1CH_3$, $(CH_3)_3SiCH_2CH_2CH_2Si(CH_3)_2(OSi(CH_3)_2)CH_2CH_2O$ $(CH_3)_3SiCH_2CH_2Si(CH_3)_2CH_2CH_2O(CH_2CH_2O)_4(CH_2CH(CH_3)O)_1CH_3$, $(CH_3CH_2)_3SiCH_2CH_2Si(CH_2CH_3)_2CH_2CH_2O(CH_2CH_2O)_4(CH_2CH(CH_3)O)_1CH_3$, $(CH_3)_3SiCH_2CH_2Si(CH_3)_2CH_2CH_2O(CH_2CH_2O)_4(CH_2CH(CH_3)O)_1CH_3$, $(CH_3)_3SiCH_2CH_2Si(CH_3)_2(OSi(CH_3)_2)CH_2CH_2O(CH_2CH_2O)_2H$, $(CH_3)_3SiCH_2CH_2Si(CH_3)_2(OSi(CH_3)_2)CH_2CH_2O(CH_2CH_2O)_3CH_3$, $(CH_3)_3SiCH_2CH_2Si(CH_3)_2(OSi(CH_3)_2)CH_2CH_2CH_2O(CH_2CH_2O)_7CH_3$, $(CH_3)_3SiCH_2CH_2Si(CH_3)_2(OSi(CH_3)_2)CH_2CH_2CH_2O(CH_2CH_2O)_{20}CH_3$, $(CH_3)_3SiCH_2CH_2Si(CH_3)_2(OSi(CH_3)_2)CH_2CH(CH_3)CH_2O(CH_2CH_2O)_4CH_3$, $(CH_3)_3SiCH_2CH_2Si(CH_3)_2(OSi(CH_3)_2)CH_2CH_2O(CH_2CH_2O)_4(CH_2CH(CH_3)O)_1CH_3$, $(CH_3CH_2)_3SiCH_2CH_2Si(CH_2CH_3)_2(OSi(CH_3)_2)CH_2CH_2O(CH_2CH_2O)_4(CH_2CH(CH_3)O)_1H$, $(CH_3CH_2CH_2)_3SiCH_2CH_2Si(CH_2CH_2CH_3)_2(OSi(CH_3)_2)CH_2CH_2O(CH_2CH_2O)_4—(CH_2CH(CH_3)O)_1CH_3$, $(CH_3)_2(CH_3CH_2CH_2)SiCH_2CH_2Si(CH_3)_2(OSi(CH_3)_2)CH_2CH_2O(CH_2CH_2O)_4—(CH_2CH(CH_3)O)_1CH_3$, $(CH_3)_2(C_6H_5CH_2CH_2)SiCH_2CH_2Si(CH_3)_2(OSi(CH_3)_2)CH_2CH_2O—(CH_2CH_2O)_7(CH_2CH(CH_3)O)_1CH_3$, $(CH_3)_3SiCH_2CH_2Si(CH_3)_2(OSi(CH_3)_2)CH_2CH_2CH_2O(CH_2CH_2O)_5(CH_2CH(CH_3)O)_2CH_3$, $(CH_3)_3SiCH_2CH_2Si(CH_3)_2(OSi(CH_3)_2)CH_2CH_2CH_2O(CH_2CH_2O)_{15}(CH_2CH(CH_3)O)_5H$, $(CH_3)_3SiCH_2CH_2Si(CH_3)_2(OSi(CH_3)_2)CH_2CH_2CH_2O(CH_2CH_2O)_2(CH_2CH(CH_3)O)_{18}CH_3$, $(CH_3)_3SiCH_2CH_2Si(CH_3)_2(OSi(CH_3)_2)CH_2CH_2CH_2O(CH_2CH_2O)_8(CH_2CH(CH_3)O)_3CH_3$, $(CH_3)_3SiCH_2CH_2Si(CH_3)_2(OSi(CH_3)_2)CH_2CH_2CH_2O(CH_2CH_2O)_4—(CH_2CH(CH_3)O)_1CH_3$, $(CH_3)_3SiCH_2CH_2Si(CH_3)_2(OSi(CH_3)_2)CH_2CH_2CH_2O(CH_2CH_2O)_{10}—(CH_2CH(CH_2CH_3)O)_5CH_3$, $(CH_3)_3SiCH_2CH_2Si(CH_3)_2(OSi(CH_3)_2)CH_2CH_2O(CH_2CH_2O)_{10}—(CH_2CH(CH_2CH_3)O)_{10}C(=O)CH_3$, $(CH_3)_3SiCH_2CH_2Si(CH_3)_2(OSi(CH_3)_2)CH_2CH_2O(CH_2CH_2O)_4(CH_2CH(CH_3)O)_1—(CH_2CH(CH_2CH_3)O)H$, $(CH_3)_3SiCH_2CH_2Si(CH_3)_2(OSi(CH_3)_2)CH_2CH_2O(CH_2CH_2O)_8—(CH_2CH(CH_3)O)_5(CH_2CH(CH_2CH_3)O)H$, $(CH_3)_3SiCH_2CH_2Si(CH_3)_2(OSi(CH_3)_2)CH_2CH_2O(CH_2CH_2O)_4(CH_2CH(CH_3)O)_1CH_3$, $(CH_3)_3SiCH_2CH_2CH_2Si(CH_3)_2(OSi(CH_3)_2)CH_2CH_2O(CH_2CH_2O)_4CH_3$, $(CH_3)_3SiCH_2CH_2CH_2Si(CH_3)_2(OSi(CH_3)_2)CH_2CH_2O(CH_2CH_2O)_5C(=O)CH_3$, $(CH_3)_3SiCH_2CH_2CH_2Si(CH_3)_2(OSi(CH_3)_2)CH_2CH_2O(CH_2CH_2O)_4(CH_2CH(CH_3)O)_1CH_3$, $(CH_3CH_2)_3SiCH_2CH_2Si(CH_2CH_3)_2(OSi(CH_3)_2)CH_2CH_2O(CH_2CH_2O)_4—(CH_2CH(CH_3)O)_1CH_3$, $(CH_3)_3SiCH_2CH_2CH_2Si(CH_3)_2(OSi(CH_3)_2)CH_2CH_2O(CH_2CH_2O)_4—(CH_2CH(CH_3)O)_1CH_3$, and mixtures thereof.

30. The metal of claim 26, wherein the coating composition further comprises a colloidal oxide selected from the group consisting of silica ($SiO_2$), cerium oxide, cerium oxide nitrate, cerium oxide acetate, zinc oxide (ZnO), zirconium dioxide ($ZrO_2$), titanium dioxide ($TiO_2$), aluminum oxide ($Al_2O_3$) and combinations thereof.

31. The metal of claim 26 further comprising a paint applied thereto.

32. The metal of claim 30 further comprising a paint applied thereto.

33. An article containing the coated metal of claim 26.

* * * * *